US007912186B2

(12) United States Patent
Howell et al.

(10) Patent No.: US 7,912,186 B2
(45) Date of Patent: Mar. 22, 2011

(54) SELECTABLE STATE MACHINE USER INTERFACE SYSTEM

(75) Inventors: David A Howell, Seattle, WA (US); David T Fong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1129 days.

(21) Appl. No.: 11/086,828

(22) Filed: Mar. 22, 2005

(65) Prior Publication Data
US 2006/0083357 A1 Apr. 20, 2006

Related U.S. Application Data

(60) Provisional application No. 60/620,826, filed on Oct. 20, 2004.

(51) Int. Cl.
*H04M 1/64* (2006.01)
(52) U.S. Cl. ............... 379/88.04; 379/88.01; 379/88.02; 379/88.08; 379/88.18; 455/413; 455/414.1; 704/270; 704/270.1; 704/275; 709/203; 709/209; 709/221; 709/228; 709/229; 715/727; 715/738; 715/744; 715/745; 715/746
(58) Field of Classification Search .... 379/88.01–88.04, 379/88.17–88.18, 88.07–88.08, 88.13; 704/270–270.1, 275, 277; 709/201–203, 709/227–229, 209, 221; 715/716–718, 727–729, 715/733, 738, 744–746; 370/352–356; 455/413, 455/414.1
See application file for complete search history.

(56) References Cited

U.S. PATENT DOCUMENTS

| 5,003,575 | A |   | 3/1991  | Chamberlin et al. |
|-----------|---|---|---------|-------------------|
| 5,557,659 | A | * | 9/1996  | Hyde-Thomson ......... 379/88.13 |
| 5,647,002 | A |   | 7/1997  | Brunson |
| 5,674,002 | A |   | 10/1997 | Powell et al. |
| 5,802,526 | A | * | 9/1998  | Fawcett et al. ............. 707/104.1 |
| 5,915,001 | A | * | 6/1999  | Uppaluru ................... 379/88.22 |
| 6,058,415 | A |   | 5/2000  | Polcyn |

(Continued)

FOREIGN PATENT DOCUMENTS
CN 1798210 A 7/2006
(Continued)

OTHER PUBLICATIONS
European Search Report dated Jun. 13, 2006 for European Patent Application Serial No. 06111468, 3 pages.
(Continued)

*Primary Examiner* — Hemant Patel
(74) *Attorney, Agent, or Firm* — Merchant & Gould

(57) ABSTRACT

A system that concurrently provides multiple user interface (UI) mechanisms that facilitate control of an application state machine (e.g., unified message system). More particularly, the invention can create two relatively distinct user experiences, one via dual tone multi-frequency (DTMF) navigation and another through speech recognition navigation of a unified message system. In accordance therewith, one single underlying state machine can be used. Navigation and flow control (e.g., state transitions) in the state machine can be leveraged by multiple UI mechanisms that actively co-exist. The invention introduces speech recognition features together with other input mechanisms to drive the UI of an application state machine (e.g., unified messaging system). The speech recognition UI can be designed to provide a natural navigation through the application independent of a DTMF UI.

20 Claims, 22 Drawing Sheets

U.S. PATENT DOCUMENTS

| | | | | |
|---|---|---|---|---|
| 6,061,433 | A * | 5/2000 | Polcyn et al. | 379/93.12 |
| 6,064,723 | A | 5/2000 | Cohn et al. | |
| 6,072,862 | A * | 6/2000 | Srinivasan | 379/100.08 |
| 6,088,428 | A * | 7/2000 | Trandal et al. | 379/88.02 |
| 6,101,473 | A * | 8/2000 | Scott et al. | 704/275 |
| 6,104,788 | A | 8/2000 | Shaffer et al. | |
| 6,173,043 | B1 | 1/2001 | Finnigan | |
| 6,411,685 | B1 * | 6/2002 | O'Neal | 379/88.14 |
| 6,522,726 | B1 * | 2/2003 | Hunt et al. | 379/88.04 |
| 6,640,242 | B1 * | 10/2003 | O'Neal et al. | 709/206 |
| 6,651,042 | B1 * | 11/2003 | Field et al. | 704/270 |
| 6,697,458 | B1 * | 2/2004 | Kunjibettu | 379/88.17 |
| 6,704,394 | B1 * | 3/2004 | Kambhatla et al. | 379/67.1 |
| 6,738,462 | B1 * | 5/2004 | Brunson | 379/142.06 |
| 6,778,644 | B1 * | 8/2004 | Jenkins et al. | 379/88.18 |
| 6,795,536 | B1 | 9/2004 | Ronca | |
| 6,801,763 | B2 * | 10/2004 | Elsey et al. | 455/404.1 |
| 6,920,425 | B1 * | 7/2005 | Will et al. | 704/275 |
| 6,981,023 | B1 * | 12/2005 | Hamilton et al. | 709/206 |
| 6,987,840 | B1 * | 1/2006 | Bosik et al. | 379/88.17 |
| 7,054,939 | B2 * | 5/2006 | Koch et al. | 709/227 |
| 7,068,643 | B1 * | 6/2006 | Hammond | 370/352 |
| 7,080,315 | B1 * | 7/2006 | Lucas et al. | 715/201 |
| 7,120,234 | B1 * | 10/2006 | Quinn et al. | 379/88.04 |
| 7,136,478 | B1 * | 11/2006 | Brand et al. | 379/265.09 |
| 7,149,777 | B1 | 12/2006 | Rhee | |
| 7,283,808 | B2 * | 10/2007 | Castell et al. | 455/413 |
| 7,289,606 | B2 * | 10/2007 | Sibal et al. | 379/52 |
| 7,315,613 | B2 * | 1/2008 | Kleindienst et al. | 379/88.13 |
| 7,356,130 | B2 * | 4/2008 | Agapi et al. | 379/77 |
| 7,551,727 | B2 | 6/2009 | Howell et al. | |
| 2001/0015972 | A1 * | 8/2001 | Horiguchi et al. | 370/352 |
| 2001/0041590 | A1 * | 11/2001 | Silberfenig et al. | 455/556 |
| 2002/0055350 | A1 * | 5/2002 | Gupte et al. | 455/412 |
| 2002/0077829 | A1 * | 6/2002 | Brennan et al. | 704/275 |
| 2002/0082030 | A1 | 6/2002 | Berndt et al. | |
| 2002/0109731 | A1 * | 8/2002 | Longobardi | 345/810 |
| 2003/0046346 | A1 * | 3/2003 | Mumick et al. | 709/205 |
| 2003/0046401 | A1 * | 3/2003 | Abbott et al. | 709/228 |
| 2003/0059000 | A1 | 3/2003 | Burton et al. | |
| 2003/0162561 | A1 * | 8/2003 | Johnson et al. | 455/553 |
| 2003/0182622 | A1 * | 9/2003 | Sibal et al. | 715/511 |
| 2003/0195937 | A1 * | 10/2003 | Kircher et al. | 709/207 |
| 2003/0235282 | A1 * | 12/2003 | Sichelman et al. | 379/201.03 |
| 2004/0141594 | A1 * | 7/2004 | Brunson et al. | 379/88.12 |
| 2004/0148356 | A1 | 7/2004 | Bishop et al. | |
| 2004/0156484 | A1 | 8/2004 | Amin | |
| 2005/0054381 | A1 * | 3/2005 | Lee et al. | 455/557 |
| 2006/0083358 | A1 | 4/2006 | Howell et al. | |
| 2009/0290692 | A1 | 11/2009 | Fong et al. | |

FOREIGN PATENT DOCUMENTS

| | | |
|---|---|---|
| EP | 1 111 891 A | 6/2001 |
| JP | 2001-292240 | 10/2001 |
| JP | 2002-269214 | 9/2002 |
| JP | 2004-260416 | 9/2004 |
| WO | 0018100 A | 3/2000 |
| WO | WO 00/27099 A | 5/2000 |
| WO | WO 00/54488 | 9/2000 |
| WO | 02077854 A | 10/2002 |

OTHER PUBLICATIONS

Chinese First Office Action dated Oct. 9, 2009 cited in Application No. 200610009316.2.

Chinese First Office Action dated Oct. 30, 2009 cited in Application No. 200510106407.3.

European Search Report dated Jan. 31, 2006 (correct date: Jan. 23, 2006); mailed on Feb. 1, 2006 cited in Application No. 05 10 9098, 8 pages.

European Communication dated Nov. 15, 2006 cited in Application No. 05 10 9098.3.

European Communication dated May 11, 2007 cited in Application No. 06 111 468.2.

European Communication dated Nov. 11, 2008 cited in Application No. 06 111 468.2.

European Office Action dated Jun. 23, 2010 cited in Application No. 06 111 468.2.

U.S. Office Action dated Apr. 10, 2008 cited in U.S. Appl. No. 11/087,007.

U.S. Final Office Action dated Dec. 10, 2008 cited in U.S. Appl. No. 11/087,007.

Japanese Notice of Rejection dated Aug. 24, 2010 cited in Application No. 2005-272278.

* cited by examiner

SELECTABLE STATE MACHINE USER INTERFACE SYSTEM

CROSS-REFERENCE TO RELATED APPLICATIONS

This application claims the benefit under 35 U.S.C. §119 (e) of U.S. Provisional Patent application Ser. No. 60/620,826 entitled "Unified Messaging System" and filed on Oct. 20, 2004, the entirety of which is incorporated by reference herein.

TECHNICAL FIELD

This invention is related to messaging systems and more particularly to a selectable user interface system that can employ variable interactive mechanisms to navigate through and control an underlying application state machine.

BACKGROUND OF THE INVENTION

A state machine is a computing device designed with the operational states required to perform a particular task or to solve a specific problem. There are countless special-purpose devices built as state machines. A voicemail system is an example of such an application state machine.

Today, many state machines, and particularly voicemail systems, employ a dual tone multi-frequency (DTMF) navigational technique that enables a user to control the state machine. In other words, a user can navigate through voicemail menus and options by pressing appropriate keys on a telephone keypad. Many of these DTMF navigational techniques require a user to memorize option choices that correspond to the numbers on a keypad.

Other DTMF systems employ a navigational technique that allows a user to spell words via a telephone keypad. This is often cumbersome and very time consuming. Other variations of DTMF voicemail systems employ voice media processing components that present to a user a set of available options. For example, a user is frequently addressed with a specific prompt such as, "please enter your password" or "press one to review all new messages." While these audible prompts are sometimes useful, they tend to be time consuming and, nonetheless, often still require the user to employ DTMF techniques via a keypad.

Recent efforts have been directed to utilizing speech recognition techniques to enable a user to navigate through state machine menus. These efforts have been very limited in that they only recognize preprogrammed menu selections and/or data. For example, a system can be programmed to recognize the names of individuals employed by a company.

Despite which technique is provided, state machines today are limited to employing a single navigational technique at any given time. In other words, in accordance with conventional systems, a user initially chooses to navigate through a state machine via DTMF or voice command techniques. However, with respect to these systems, both options are usually not simultaneously or concurrently available and the user does not have the option of toggling between the navigational systems during any one session.

Although attempts have been made to employ either DTMF or voice recognition techniques to effect navigation through a state machine (e.g., a voicemail system), a substantial need exists for a system that simultaneously or concurrently provides the functionality of multiple disparate navigational techniques thereby permitting a user to select a preferred user interface technique at any time throughout a session. Additionally, a need exists for a system and/or methodology that employs voice recognition mechanisms to effect versatility in connection with state machine navigation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention, in one aspect thereof, allows a user to connect to a server (e.g., messaging server) via a telephonic communication component thereby accessing the rich information therein. The invention comprises a system and/or methodology that unifies a telephonic communication component and/or system with an application state machine (e.g., messaging server component and/or system). More particularly, in one aspect, the invention creates two relatively distinct user experiences, one through the use of dual tone multi-frequency (DTMF) navigation and one through speech recognition navigation. In accordance thereto, one single underlying state machine can be used.

Navigation and flow control (e.g., state transitions) in the state machine can be leveraged by multiple user interface (UI) mechanisms that co-exist actively. The invention introduces speech recognition features together with other input mechanisms to drive the user interface of an application state machine (e.g., a unified messaging system (UM)). In accordance with an aspect of the invention, the speech recognition UI is designed to provide a natural navigation through the application independent of a DTMF user interface. The user can navigate through the speech menu without having to enter any DTMF data.

In accordance with the subject invention, both the DTMF-based menu infrastructure and the speech recognition menu structure can be active and available to the user at any time. For example, at any time during the experience the user can switch from speech mode to DTMF driven mode. Because the switch does not need to be explicit, the user can issue either a DTMF or a speech command at any time.

In another aspect, the prompts that will be played for the user upon entering any part of the application can be based on the UI mechanism that the user used to enter the state. For example, the speech menu will be played if speech commands brought the user to the state. On the other hand, the DTMF menu will be played if a DTMF command brought the user to the state.

In yet another aspect, from either the speech or DTMF UI the user can, at any time, say "help" to review available speech commands or press "0" to review available DTMF commands. In accordance with the co-existence of the UI mechanisms, both sets of commands are available at all times. The default UI that is presented to the user on first entry to the UM system can be set as a personal option. Rule-based logic and/or artificial intelligence reasoning mechanisms can be employed to determine the default UI.

The underlying application state machine is leveraged for the multiple co-existent UI models. Specific to aspects of the speech UI are additional design paradigms selected to exploit some unique features of speech recognition. For example, the speech UI can have distinct prompts and menus for handling user input, input validation, and error handling for low confidence recognition results.

In still other aspects, a set of "anytime" shortcuts can be available at all times to jump to the main functionality of the underlying state machine (e.g., unified messaging application). In the unified messaging application example, these main functionality locations can be voicemail, calendar, call someone, email, and personal options.

Each speech menu can also have menu commands that are specific to the menu context. For example, with access to an application programming interface, the invention can add functionality to enable telephonic generation and retrieval of email communications. The invention can further facilitate accepting or canceling calendar items (e.g., meeting requests and appointments) via a telephonic communications device.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
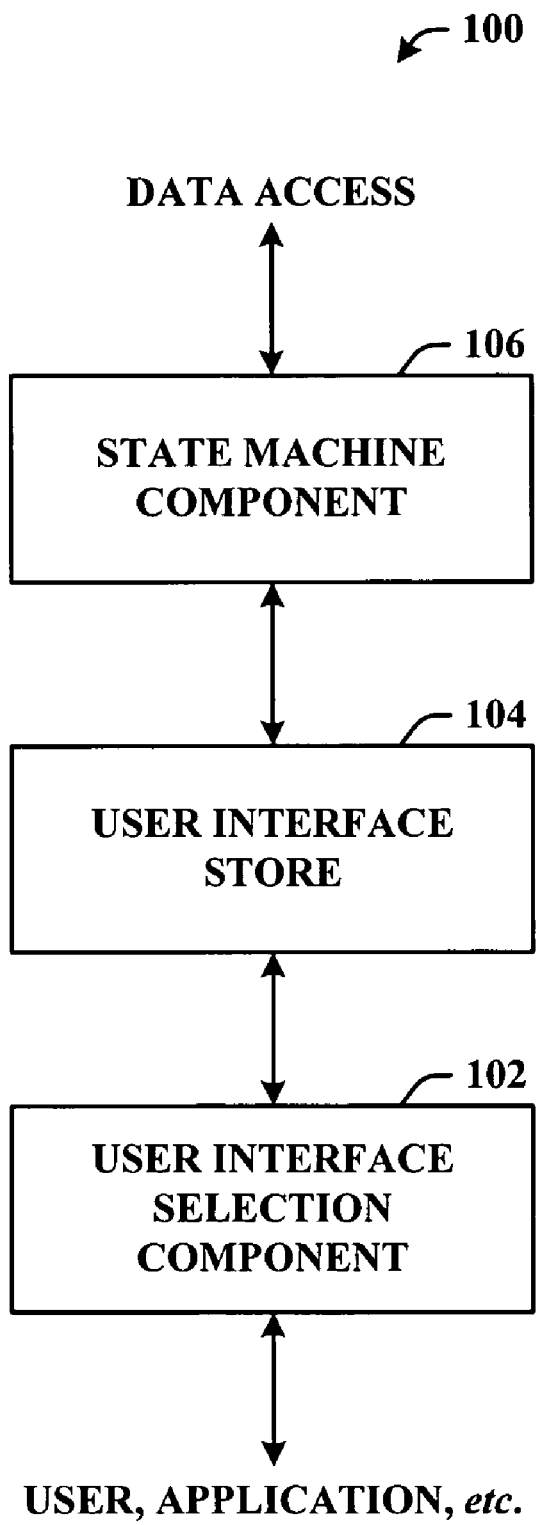
FIG. 1 is a high-level exemplary system architecture that facilitates state machine user interface selection in accordance with an aspect of the invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a high-level architectural diagram of a system 100 in accordance with an aspect of the subject invention. Generally, the system 100 can include a user interface (UI) selection component 102, a UI store 104 and a state machine component 106. It will be understood and appreciated that a novel aspect of the invention is to decouple the UI mechanisms from the state machine 106. The invention can employ multiple UI mechanisms to effect navigation within an application state machine. Further, a novel aspect of the invention can concurrently employ multiple UI interfaces (e.g., dual tone multi-frequency (DTMF), speech recognition).

In other words, in accordance with novel aspects of the invention, multiple UI mechanisms can be active at any time allowing a user to freely switch between UI mechanisms. In the example that follows, this invention employs a novel design that allows for the co-existence of two or more UI mechanisms (e.g., DTMF and speech recognition) that enable telephone access to a user inbox. Furthermore, the two or more UI mechanisms can simultaneously leverage the underlying application state machine.

The exemplary aspects that follow are directed to the use of the UI selection component 102 and the UI store 104 in connection with a voicemail application (e.g., state machine 106). However, it is to be appreciated that the state machine component 106 can be any application state machine. Accordingly, the UI selection component 102 can effect utilization of any available UI mechanisms. By way of example, in operation, a user can employ the UI selection component 102 to select a DTMF navigational technique to control the operation of an underlying state machine (e.g., voicemail system). As well, the UI selection component 102 can be employed to facilitate a speech recognition navigational technique. It is to be understood that the UI selection component 102 can be continuously available thereby providing a user the ability to toggle between UI navigational techniques at any time during a session.

While the exemplary aspects described herein are directed to systems that employ a DTMF and/or voice recognition navigational technique, it is to be understood that any navigational technique can be employed without departing from the spirit and/or scope of the functionality of the invention. For example, other aspects can employ a pointing device to effect navigation with reference to a state machine.

Figure 2:
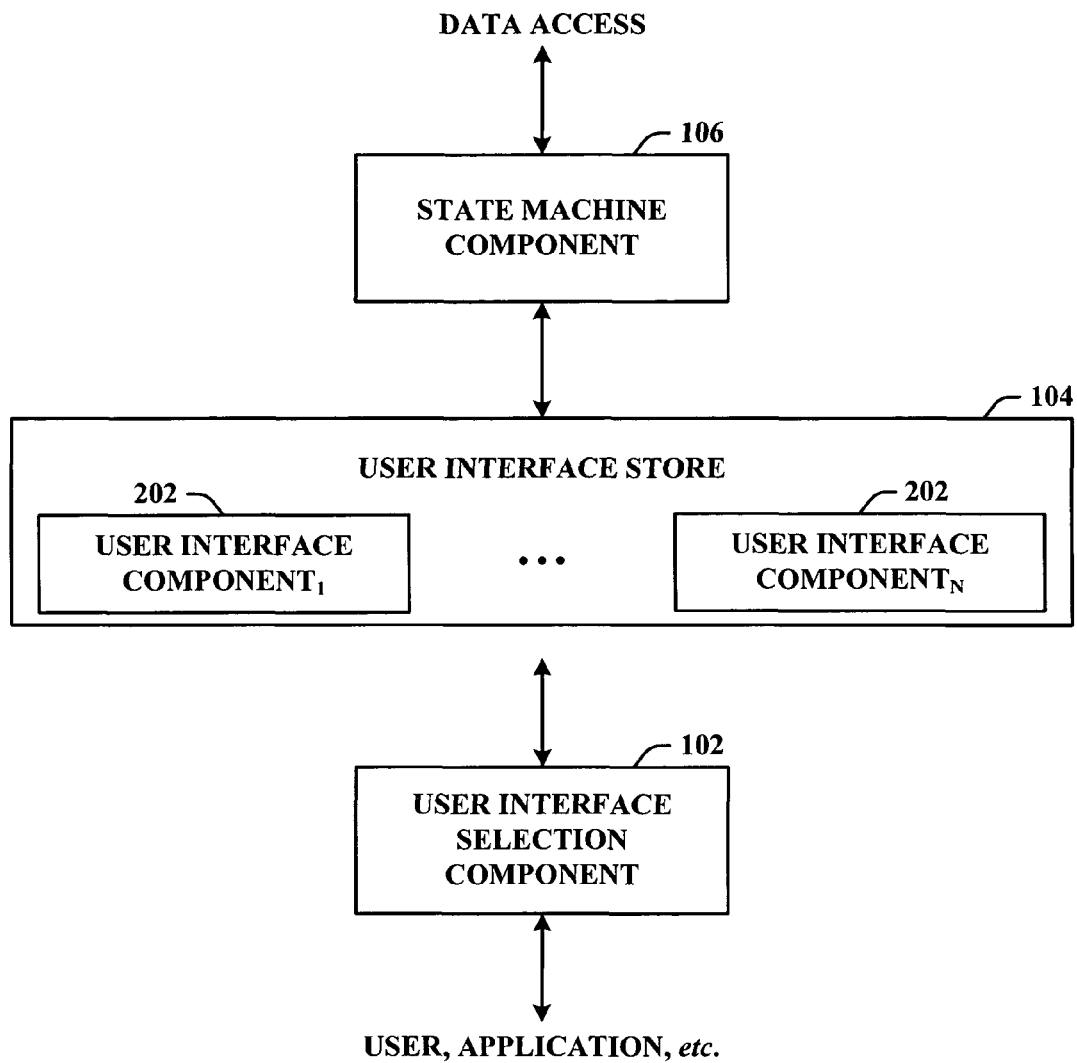
FIG. 2 is an exemplary system that illustrates a user interface store having disparate state machine user interface components in accordance with a disclosed aspect.

Turning now to FIG. 2, there is illustrated a more detailed architectural diagram of an aspect of the invention. As described supra, in order to create two distinct user experiences, one single underlying state machine component 106 can be used in connection with multiple UI mechanisms. In accordance therewith, flow control (e.g., state transitions) in the state machine can be leveraged by both UI mechanisms.

As shown in FIG. 2, the UI store 104 can include 1 to N UI components, where N is an integer. It will be appreciated that 1 to N UI components can be referred to individually or collectively as UI components 202. A more specific example of the UI store 104 is illustrated in FIG. 3.

Figure 3:
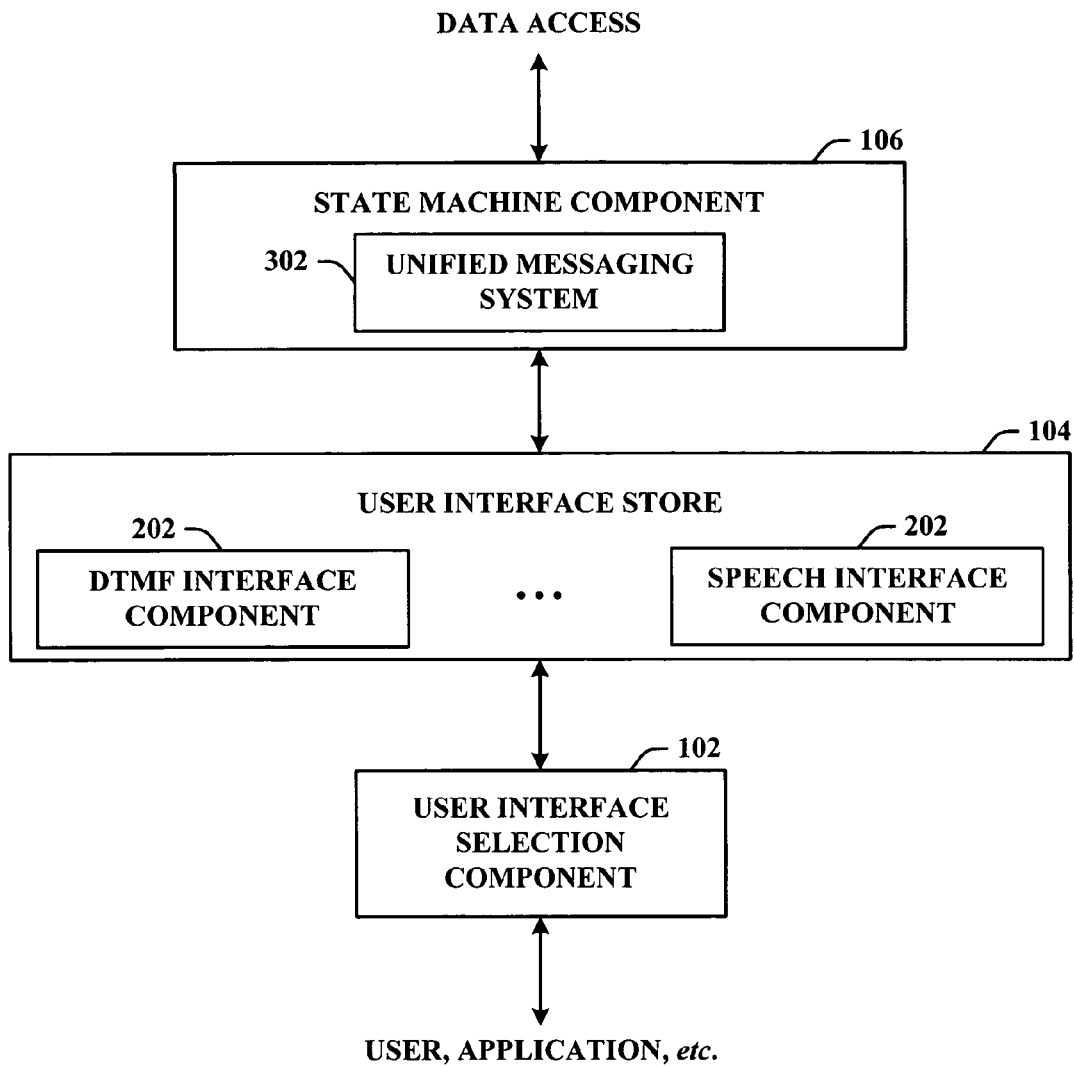
FIG. 3 illustrates a system architecture that facilitates user interface selection with respect to a unified messaging system in accordance with a disclosed aspect.

Referring to the exemplary aspect of FIG. 3, as illustrated, the UI store 104 can include UI components 202 including, but not limited to, a DTMF UI component and a speech UI component. Additionally, the state machine component 106 can include a unified messaging system 302. The unified messaging system 302 can unite a telephonic system with an electronic messaging and/or organization system. An exemplary unified messaging system will be discussed in detail infra.

As described supra, the invention introduces speech recognition features together with DTMF features to drive the UI of unified messaging system 302. In accordance with an aspect, the speech recognition UI 202 can be designed to provide a natural navigation through the application (e.g., state machine 106) independent of the DTMF UI 202. Because the invention decouples these UI mechanisms, the user will be able to drive through the speech menu without having to enter any DTMF input(s).

It is a novel feature of the invention to enable both the DTMF-based menu infrastructure and the speech recognition menu structure to be active and available to the user at any time. At any time during a session or experience, the user can independently switch from speech mode to DTMF driven mode. The switch need not be explicit; the user need only issue either a DTMF signal or a speech command to automatically effect the transition.

Continuing with the voicemail system example, the prompts that will be played for the user on entering any part of the application will be based on the UI mechanism the user employed to enter the state. If speech commands were employed to bring the user to a state, the speech menu will be played. On the other hand, if a DTMF command brought the user to the state, the DTMF menu will be played. Additionally, from either the speech or DTMF UI 202 the user can employ "help" to determine the commands. For example, at any time the user can say "help" to review available speech commands or press "0" to review available DTMF commands. Both sets of commands are available at all times.

A default UI that is presented to the user on first entry to the unified messaging system 302 can be set as a personal option. As well, it will be appreciated that rule-based logic and/or artificial intelligence (AI) techniques can be employed to automate the selection process. These rule-based logic and AI based reasoning techniques will be discussed in greater detail infra.

Specific to the speech UI 202 are additional design paradigms selected to exploit some novel features of speech recognition. The speech UI 202 can have distinct prompts and menus for handling user input, input validation, and error handling for low confidence recognition results. Further, the DTMF prompts will not be reused or converted to "press or say". The speech prompts and menus can go through a full usability pass including user education review. Menus can be generated to sound natural for the user. For example, a menu can be generated to say "Would you like to make a call or access your mailbox?" rather than "Say 'make a call' to call someone or 'access mailbox' to access your mailbox".

A set of "anytime" shortcuts can be available at all times to jump to the main functionality of the unified messaging application 302. As will be discussed in detail infra, the main functionality can include voicemail, calendar, call someone, email, and personal options. Each speech menu can also have menu commands that are specific to the menu context.

In an alternative aspect, the invention can limit access to features of the unified messaging application 106. In other words, if it makes the application flow more natural, some more obscure or less important features may only be provided through DTMF mode. These features can be preprogrammed and/or defined by a user as desired. As will be better understood with reference to FIGS. 17 to 21, within the speech menus, menu flexibility can be increased since there is no concern around reusing DTMF digits. For example, in the voicemail, email and calendar playback menus there does not need to be a distinction between the "during playback" and the "after message" menu.

It will be appreciated that, in connection with using speech commands, the DTMF paths of typing an extension and spelling out a name collapse to a single item with "Find [Person Name]". Furthermore, the infrastructure around contact navigation can also collapse into "Find [Person Name]." Occasional word combinations such as "I'll be 15 minutes late"

combine what was previously two entries under DTMF mode (e.g., an entry for late and then a separate entry for the time.)

An overview of the speech recognition menu structure is described with reference to FIGS. 17 to 21. These figures display both the DTMF menu infrastructure and the speech user interface overlay. The speech diagrams are intended to show the main grammar elements of an exemplary UI and the overall flow rather than every specific prompt and error handling condition. The flow diagrams included are not intended to limit the scope and/or novel functionality of the invention in any way.

The aforementioned novel aspects of the invention can employ rule-based logic and/or AI reasoning technology to effect, predict and/or infer an action. More particularly, it will be appreciated that the subject invention (e.g., in connection with state analysis, UI selection, voice recognition) can employ various rule-based and/or AI based schemes for carrying out various aspects thereof.

Figure 4:
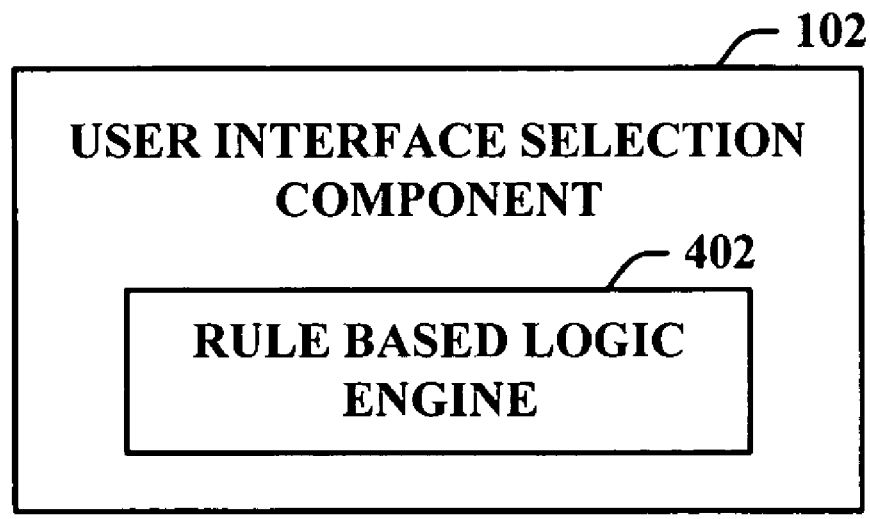
FIG. 4 illustrates a user interface selection component that employs a rule-based logic engine in accordance with a disclosed aspect.

Continuing with the above-described scenarios and with reference to FIG. 4, a block schematic view of an alternative UI selection component 102 is shown. As illustrated, UI selection component 102 can include a rule-based logic engine 402. As will later be described with reference to FIG. 5, an optional AI component (not shown) can be used together with, or in place of, the rule-based logic engine 402 to automatically infer an action or set of actions to be employed in connection with the functionality of the UI selection component 102 described supra.

In the exemplary aspect of FIG. 4, the rule-based logic engine 402 can be programmed or configured in accordance with a predefined preference (e.g., a rule). For example, a rule (e.g., logic) can be constructed to automatically select a specific UI based upon defined criteria. Accordingly, the system can automatically select and employ a specific UI. More particularly, a rule can be established to take into consideration the origination location (e.g., internal, external, Internet . . . ), originator, target location, etc., to automatically select and employ a UI.

Figure 5:
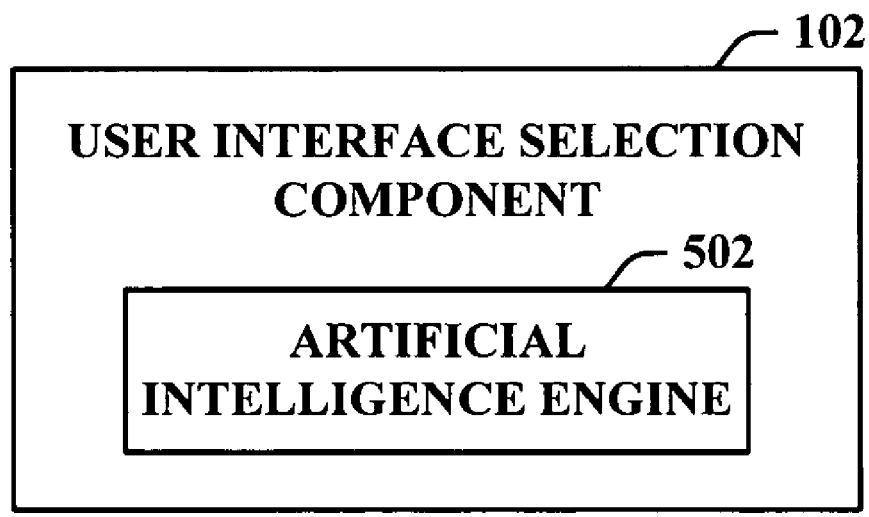
FIG. 5 illustrates a user interface selection component that employs an artificial intelligence component in accordance with an exemplary aspect.

A schematic diagram of another alternative aspect of the subject invention is illustrated in FIG. 5. The UI selection component 102 of this alternative aspect illustrated in FIG. 5 employs an AI component 502 that can automatically infer and/or predict an action. This alternative aspect can optionally include an inference module (not shown) that facilitates automatic selection of the UI selection component 102.

In accordance with this aspect, the optional AI component 502 can facilitate automatically performing various aspects (e.g., state analysis, UI selection, and voice recognition) of the subject invention as described herein. The AI component 502 can optionally include an inference component (not shown) that can further enhance automated aspects of the AI component utilizing, in part, inference-based schemes to facilitate inferring intended actions to be performed at a given time and/or state. The AI-based aspects of the invention can be effected via any suitable machine-learning based technique and/or statistical-based techniques and/or probabilistic-based techniques.

In the alternate aspect, as further illustrated by FIG. 5, the subject invention (e.g., in connection with state analysis, UI selection, and voice recognition) can optionally employ various AI-based schemes for automatically carrying out various aspects thereof. Specifically, the AI component 502 can optionally be provided to implement aspects of the subject invention based upon AI processes (e.g., confidence, inference . . . ). For example, a process for initiating a UI based upon user preferences or sender identification can be facilitated via an automatic classifier system and process. Further, the optional AI component 502 can be employed to facilitate an automated process of selecting a UI based upon a predicted and/or inferred preference.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Figure 6:
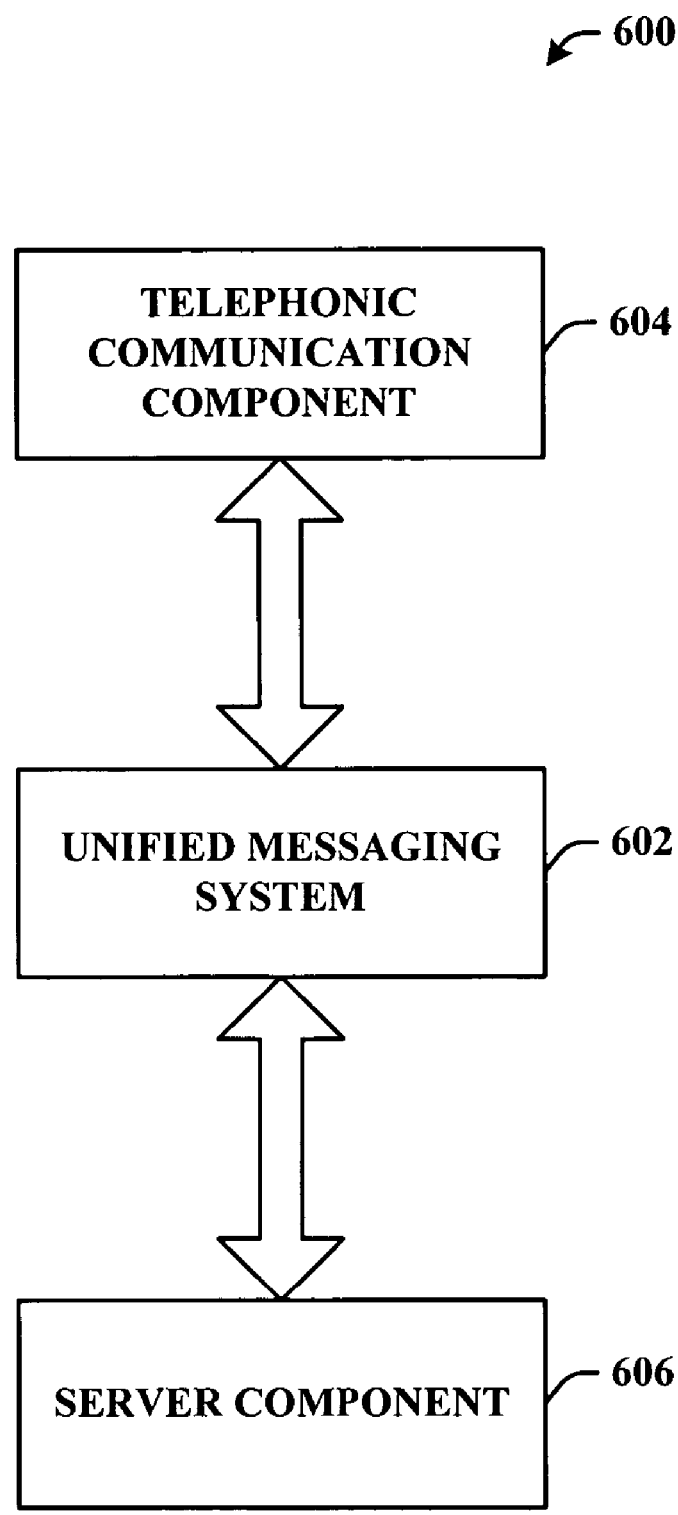
FIG. 6 illustrates a high-level exemplary system architecture that facilitates communication in accordance with an aspect of the subject invention.

Referring now to FIG. 6, there is illustrated a high-level architectural diagram of a system 600 in accordance with an aspect of the subject invention. Generally, the system 600 can include a unified messaging (UM) system component 602, a telephonic communication component 604 and a computer application, state machine and/or server component 606. As described supra, the UI selection component 102 (FIG. 1) and subsequent functionality of the subject invention can be employed in connection with the unified messaging system 602. More particularly, as illustrated in FIG. 6, the subject invention can be employed to enable a UI to be selected thus effecting telephonic access to rich data maintained within a server component. This telephonic access can be effected via a unified messaging system 602.

The telephonic communication component 604 can include any device capable of communicating voice and/or audible sounds and signals (e.g., DTMF). By way of example, the telephonic communication component 604 can include a traditional wired telephone as well as wireless (e.g., cellular) telephones. Further, the telephonic communication component 604 can be effected via a portable wireless device and/or computer that employs voice over Internet protocol (VOIP) or fax over Internet protocol (FOIP).

The server component 606 can be employed to host any communication and/or organizational application. For example, the server component 606 can host communication applications including, but not limited to, voicemail, email, text messaging applications or the like in connection with aspects of the subject invention.

In one aspect, the UM system 602 can unite the telephonic communications system 604 with the server component 606

(e.g., mailbox server). Accordingly, the telephonic communications system 604 can access the rich information maintained in the server component 606 thereby, unifying the systems. Although FIG. 6 illustrates a single telephonic communications system 604 and a single server component 606, it is to be understood and appreciated that the invention is extensible thereby being capable of uniting multiple telephonic and/or server systems.

Figure 7:
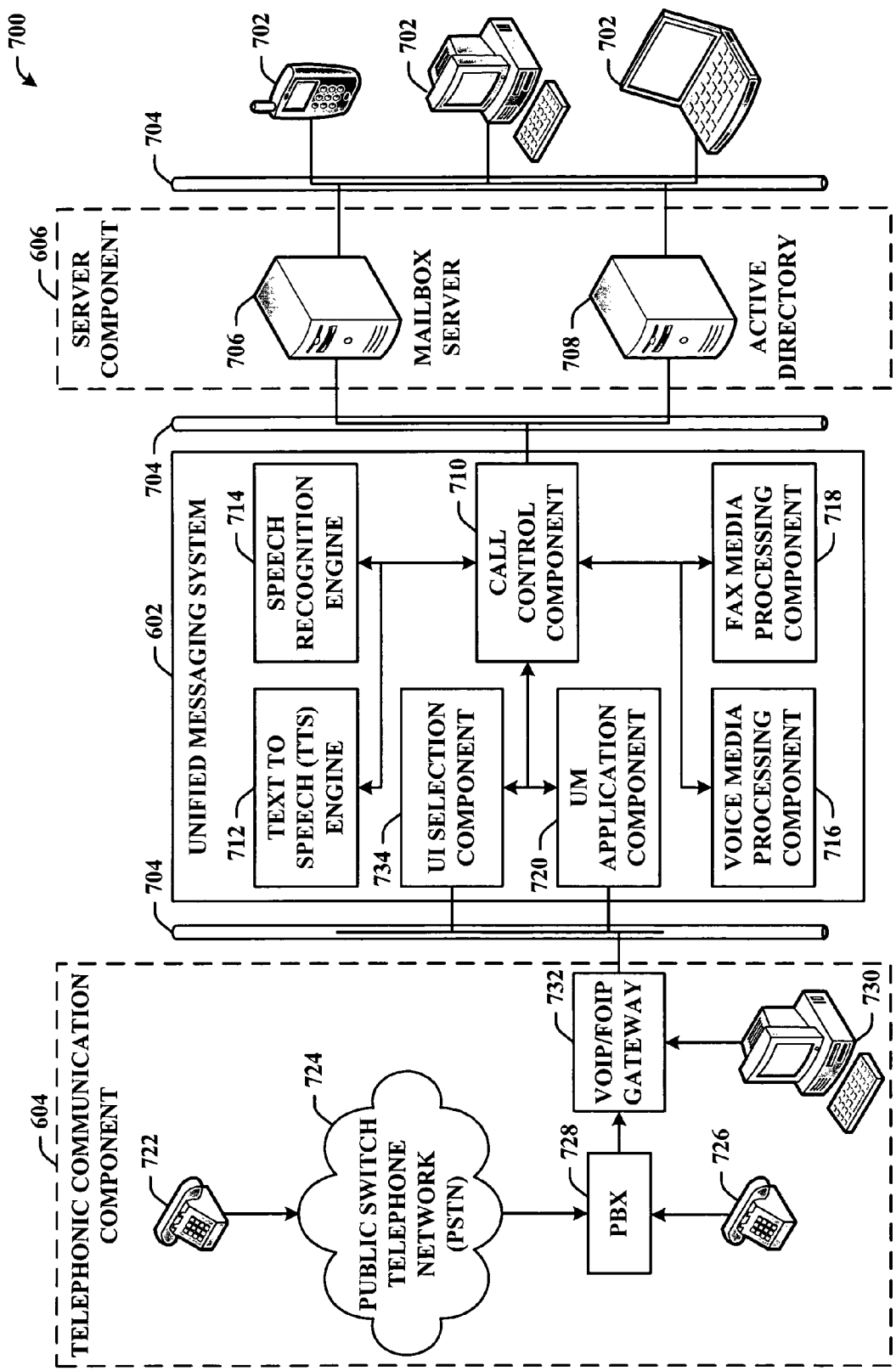
FIG. 7 illustrates an exemplary system architecture that employs a unified messaging system in accordance with a disclosed aspect.

Referring now to FIG. 7, there is illustrated an exemplary system architecture in accordance with an aspect of the invention. The system 700 generally includes the UM system 602, telephonic communications system 604 and server component 606. In one aspect, as illustrated, the telephonic communication component 604, the server component 606 and a plurality of clients 702 can be connected to the UM system 602 via a wired local area network (LAN) connection 704 (e.g., Ethernet). Although three specific clients 702 (e.g., smart phone, desktop, laptop) are shown, it is to be appreciated that any number of clients 702 (e.g., email clients) can be employed without departing from the spirit and/or scope of the subject invention. It will be understood that, in alternate aspects, connections illustrated in FIG. 7 can be wired, wireless or a combination thereof.

Furthermore, it is to be appreciated that the clients 702 can employ disparate communication techniques in order to communicate with the server component 606. For example, a smart phone, pocket personal computer (PC) or other handheld device can employ specialized communication software to synchronize to the mailbox server 706 or the active directory server 708. In another example, a desktop (e.g., client 702) can employ a wired (e.g., Ethernet) connection thereby gaining access to the server component 606. Yet another exemplary client of the three clients 702 (e.g., laptop) can employ a wireless Internet connection to access the server component 606.

Turning now to the UM system component 602, a call control component 710, text-to-speech (TTS) engine 712, speech recognition engine 714, voice media processing component 716, fax media processing component 718 and UM application component 720 can be provided. Each of these components can be better understood with reference to the exemplary scenarios infra.

The telephonic communications component 604 can include a public telephone 722 connected via a public switched telephone network (PSTN) 724, a private (e.g., in-house company) phone 726 connected via a private branch exchange (PBX) 728 or private telephone switchboard, and computer system 730 that employs VOIP or FOIP via gateway 732. It will be appreciated that these components are exemplary and are not intended to be an exhaustive list of the telephonic communications component 604. In other words, telephonic communications component 604 can include any mechanism capable of generating and/or transmitting audible (e.g., voice, fax) signals.

Additionally, UM system 602 can include a UI selection component 734 to effect selection of an appropriate UI as described supra. Although not illustrated in FIG. 7, it is to be understood that the UI selection component 734 can communicate with a UI store (not shown) in order to effect the desired and/or selected UI. It will further be appreciated that the UI store (not shown) can be co-located or located remotely from the UI selection component 734. For example, the UI store (not shown) can be located within server component 606.

Figure 8:
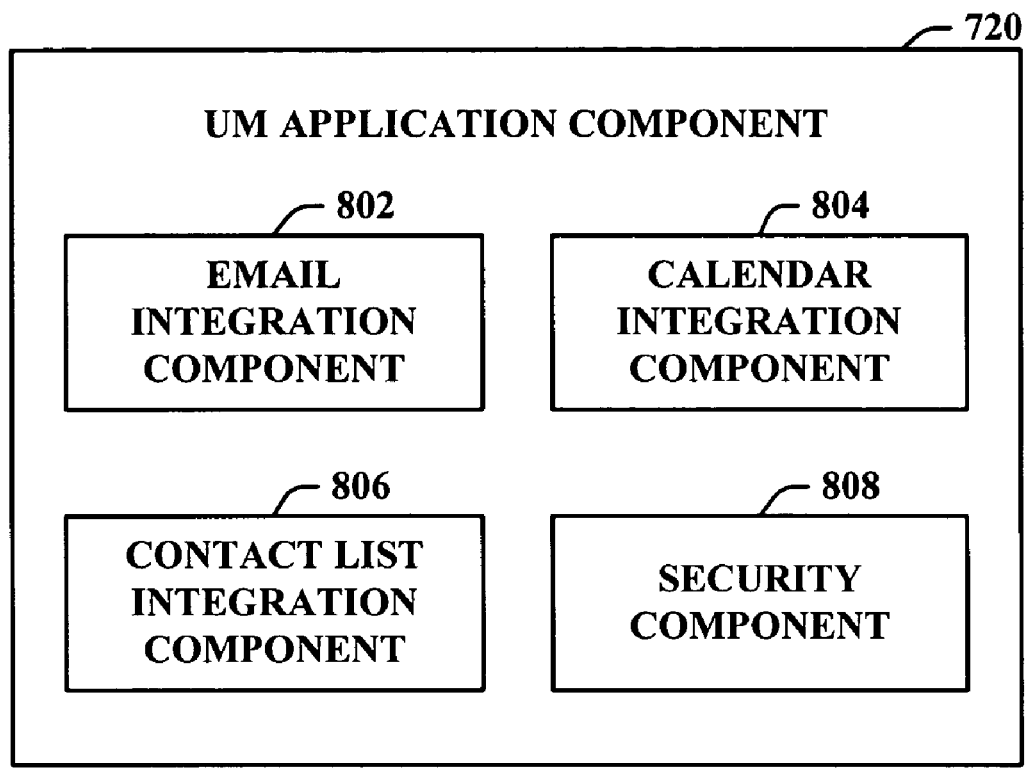
FIG. 8 is a call control component that facilitates content conversion and interpretation in accordance with a disclosed aspect.

FIG. 8 illustrates an implementation of the call control component 710. More particularly, UM application component 720 can include an email integration component 802, a calendar integration component 804, a contact list integration component 806 and a security component 808. Each of these components (802, 804, 806, 808) will be better understood upon a discussion of the exemplary scenarios that follow. Although the UM application component 720 of FIG. 8 illustrates four exemplary functional components, it is to be appreciated that the functionality of these components described in the following scenarios can be combined (or separated) into disparate components. As well, it will be appreciated that the components described herein can be co-located or remotely located without departing from the scope of the subject invention.

In order to provide context to the invention, the following exemplary scenarios are provided. It is to be appreciated that the following scenarios are included merely to provide context to the invention. It will also be appreciated that additional scenarios exist which are not specifically disclosed herein. To this end, the scenarios infra are not intended to limit the scope and/or functionality of the subject invention.

A first exemplary scenario is directed to a discussion of the email integration component 802. More particularly, this scenario is directed to integration of an "out-of-office" (OOF) voicemail greeting and email. With reference again to FIG. 7, conventionally, the OOF status can be separately set on both a user specific email account (e.g., via client 702) or voicemail account (e.g., via telephone 722, 726). As will be appreciated, an OOF email auto-reply generated via the server component as well as the voicemail extended absence (e.g., OOF) greeting often contain similar information. The subject invention can facilitate setting both the email and the voicemail OOF status from a single location in a single operation.

With continued reference to FIG. 7, when a user sets the OOF status from the email application (e.g., client 702), the UM system 602 can integrate (e.g., synchronize) the OOF message into the telephonic communications component 604. Accordingly, calls to the user via the telephonic communications system 604 will include an audible version of the OOF extended absence greeting. Through the use of text-to-speech conversion techniques of the TTS engine 712, this greeting can audibly render the text contained in the email OOF auto-reply.

Similarly, in the event that a user sets the OOF from the telephonic communications component 604 (e.g., telephone 722), through voice recognition techniques of the speech recognition engine 714, the unified messaging system 602 can automatically set an email OOF message in the mailbox server 706. Thereafter, a sender of an email to the user will receive a text version of the OOF auto-reply that was originated via telephonic communication mechanisms.

A second scenario is directed to the calendar integration component 804 and particularly to calendar or planner access and management. Today, users have limited access to their calendar from telephonic systems (e.g., 722, 726, 730) and can only read the information corresponding to appointments, which is maintained within server component 606. In accordance with an aspect of the subject invention, users can manage appointments and initiate communications related to appointments via the telephonic communications component 604 (e.g., telephone 722, 726, 730). It will be appreciated that full planner functionality can be facilitated via speech recognition component 714 of the UM system 602. For example, via the telephonic communications device 604, a user can accept, decline, modify, cancel, and communicate with respect to appointments contained within the server component 606.

In one aspect, a telephonic session with the UM system 602 can be automatically transferred to a telephone of a meeting location. In other words, via the telephonic communications component 604, a user can connect to the UM system 602 whereby, based upon a calendar (e.g., appointment) entry in the server component 606, a determination can be made with respect to an appropriate transfer target location for the call. Finally, by contacting the UM system 602 via any telephonic communications device 604, a user can initiate a targeted or broadcast electronic message (e.g., email) to the meeting participants. For example, a user can inform meeting participants of a delayed arrival to a meeting.

Yet another aspect is directed to remote access of contact list entries via the contact list integration component 806. In connection with systems today, users cannot telephonically access their personal contact list, which is frequently stored on the email system (e.g., server 606). In accordance with an aspect of the invention, from the telephonic communications device 604 (e.g., telephone 722, 726, 730), a user can search for contacts in the contact list maintained within the server 606. If desired, the user can immediately connect to or leave a message (e.g., voice, text, email) for the contact. If the contact is an external contact with only an email address, this invention can allow a user to communicate an audible message by creating an email with a sound file attachment (e.g., .wav) thereby forwarding the communication to the intended target.

Turning now to a discussion of the security component 808 functionality of the UM application component 720, the subject invention can be employed to reset a personal identification number (PIN) via an email or other application. By way of example, when users forget their telephone voicemail PIN (e.g., password), they frequently have to contact an information technology (IT) helpdesk or system administrator to reset it. In accordance with the UM system 602, this invention can allow a user to log into their email on the server component 606 using domain credentials and reset/change their telephone voicemail PIN (e.g., password).

Yet another scenario involving the security component 808 is directed to digital rights management for voicemail. When leaving a voicemail today on the telephone, senders do not have any way to restrict the access to and/or management of the message. With this invention, voice messages can be sent with restricted access. For instance, a voicemail can be sent whereby a recipient can listen to the voicemail, but can be restricted from forwarding or saving the message.

Referring again to the email integration component 802, conventionally, in situations where listening to a sound file is not appropriate (e.g., in a meeting), users are unable find out the contents of their voicemail. The UM system 602 (e.g., email integration component 802) of the subject invention provides for text preview of voicemails (and vice versa). In accordance with the UM system 602, via an email client 702, users can textually access voicemails on their computer, laptop or other suitable device (e.g., smart phone). Through voice recognition techniques (e.g., speech recognition engine 714), the subject invention can convert the voicemail thereby transcribing it into text. Therefore, users can review the content of the voice message without playing the sound file. Similarly, the TTS engine 712 can be employed to convert and deliver email communications via the telephonic communications device 604.

Additionally, the invention can facilitate converting electronic message attachments (e.g., word processing documents) to audible files (e.g., voice). This can be accomplished via the TTS component 712. In accordance therewith, in addition to rendering the audible content of an electronic communication, the subject invention can render an audible file that contains the content of a textual attachment. It will be understood that the TTS conversion techniques and navigational concepts described herein can be applied to file system directories and the like. In other words, the speech recognition engine 714 can be employed to effect navigation within a file system directory. Accordingly, the TTS engine 712 can be employed to convert a target document to speech thus rendering the audible (e.g., voice) file to a user via the telephonic communications component 604.

Another aspect is directed to employing the email integration component 802 to facilitate analyzing the content of an email communications message. For example, when email messages are audibly rendered to a user via the telephonic communications device 604, (e.g., telephone), often the messages can be very long and difficult to follow. A novel feature of an aspect of this invention can employ logic and/or reasoning techniques to identify the most important messages and/or sentences (e.g., content) included in a communication. These logic and/or reasoning mechanisms can employ rule-based and/or artificial intelligence (AI) mechanisms to effect filtering and/or sorting of the content. Once identified, a streamlined or condensed version of the content can be audibly rendered to a user.

As previously described, the UM system 602 can limit the audible playback of email messages to include only the most important messages and/or sentences included therein. It will be appreciated that because the content can be filtered and/or sorted in accordance with a desired algorithm (e.g., rule based, AI), the quantity and length of the message(s) that are read to the user can be decreased. Likewise, important voicemail messages can be handled (e.g., filtered, sorted) in the same manner. Of course, when people receive many email messages over the telephone it can be difficult to navigate to the particular messages that are important to the user. With this invention, important voicemails can be identified by the UM system 702 and read to the user first. As well, voice messages can be filtered whereby only portions of the voicemails are read to the user.

Another novel feature of the subject invention is directed to facsimile transmissions. By way of example, in some organizations, all inbound facsimiles are directed to one mailbox where a router looks at the facsimile and directs it, via electronic means, to the appropriate person in the organization. If the facsimile message contains sensitive information, the person who is redirecting the facsimile would have access to information that was intended to be confidential. In accordance with an aspect of this invention, the UM system 602 can employ the fax media processing component 718 to separate the cover page from the remaining pages of a facsimile transmission. Therefore, the router who is redirecting the message can only have access to the cover page of the facsimile and not the confidential contents.

In another scenario, when people call a user and are transferred to the voicemail system, but do not leave a message, the callee does not always know that someone has called. In accordance with an aspect of this invention, the UM system 602 can generate and forward an email message to the callee thereby notifying that someone has called but did not leave a voicemail message.

Still another novel aspect of the invention is directed to policy and compliance integration with an email system. Conventionally, voice messages are stored on a server (e.g., server component 606) and are retained and/or archived according to an arbitrary or preprogrammed policy. For example, one such policy can delete messages after a specific number of days (e.g., 21). With this invention (e.g., integration with the email system), a user can control which messages are deleted or archived from the telephonic communications component 604. As well, logic and/or reasoning mechanisms can be applied to automatically manage retention and/or deletion of messages.

Yet another aspect of the invention is directed to a system and/or methodology to permit a user to select a keystroke profile scheme. It will be appreciated that different voicemail systems can have different keys to navigate and control the telephone user interface. If users change from one system to another, they often have to learn the new keys to use the new system. With this invention, button profiles can be employed for the most commonly used systems. Accordingly, a user can choose a predetermined profile that is familiar to that particular user. As well, buttons can be programmed as desired by a specific user. In this manner, the user does not necessarily have to learn a new keystroke profile scheme to access a new system.

Another novel aspect of the security component 808 is directed to employing voice recognition techniques to effect voicemail authentication. Today, when users access their mailbox from the telephone, they typically key in a PIN as their password. In many cases, this is not very secure and is inconvenient to the user (e.g., accessing while driving a car). With this invention, users can audibly speak a phrase or desired PIN to gain access to their mailbox. This can be more convenient and also more secure as the voice phrase must match a previously recorded phrase by the user. As well, the system can be programmed to learn qualities (e.g., voice tonal qualities) specific to a user.

Yet another exemplary aspect is directed to end-user configuration of menus and prompts. When end-users access their mailbox via the telephone, they do not have the capability to change the buttons or the information that is played back to them during the greeting. With this invention, users can specify a location of their greeting, therefore, depending on the user role, a more detailed greeting that contains additional information may be used. For example, an IT administrator might choose to put the number of critical escalation cases in their main mailbox greeting. In alternate aspects, it is to be appreciated that prompts (e.g., audio) can be customized on a per user basis. As well, the ordering of the state machine can user customizable.

In summary, aspects of the subject invention are directed toward at least the following novel components employed in connection with the UM system 602.

OOF Voicemail Greeting Integration with Email Application—The aspect that the email and voicemail systems OOF status can be content matched thereby enabling a user to set the OOF status from one place. For example, the auto-reply email body can be read to the user as the telephone greeting using TTS mechanisms.

Calendar Access—Capability to act on and interact with calendar appointments from the telephone in a novel manner. For example, a user can accept, decline, cancel, transfer to the phone of the meeting location, and initiate an email message to the meeting participants.

Contact List Access—Capability to access personal contact list, rather than just the company directory. Ability to send, via the telephone, an email and sound file attachment to an email account.

PIN Reset—Allowing the user to reset a password (e.g., voicemail password) via an email client. It will be understood that the operating system security credentials can maintain security.

Digital Rights Management for Voicemail—Digital rights for voicemails are a new and novel concept. In other words, the invention can be employed to control and/or restrict access to voicemail content. For instance, a recipient can listen to a voicemail, but can be restricted from forwarding or saving the message.

Text Preview of Voicemails—Using speech to text conversion techniques, the subject invention can convert recorded voicemails into a textual message. The message can then be sent to the recipient via an email client application. As well, the system contemplates text-to-speech conversion for text messages. Moreover, the system contemplates generating and attaching a sound file (e.g., .wav format) of a voice message to an email. Thus, the email and attachment can be forwarded to the recipient.

Secure Facsimile Handling—The subject invention can extract the cover page (e.g., first page) from a received facsimile transmission thereby, retaining confidentiality of remaining pages of the transmission.

Most Importance Sentences—Based upon predefined logic and/or reasoning techniques, the invention can determine and rank sentences of a communication (e.g., email and/or voicemail) in terms of importance. For example, ranking can occur with regard to a given an email thread and key words contained therein. It will be appreciated that the ranking of sentences and/or keywords can generally provide a summary of the entire email without having to review it completely. Additionally, aspects are directed to using this technology for reading textual emails via the telephone, which is also a novel concept of the invention.

Important Messages—The fact that users can optionally apply filtering criteria (e.g., rule-based, AI) is particularly novel with respect to email messages. The subject invention can analyze email threads and rank them accordingly. By way of example, the system can determine the sender of a message, employ a policy, logic and/or reasoning mechanism thereby ranking and/or categorizing the importance of the messages. In one aspect, the system can use this technology to determine an order with respect to reading the messages to the user over the telephone. As well, this technology can be employed to filter emails prior to presenting them to a user via a telephone.

Missed Call Notification—This component can be integrated into the unified messaging system thereby providing third party call control by monitoring traffic. In one aspect, the system can monitor and advise a client of received calls.

Policy and Compliance Integration with Email System—novel rule-based and/or AI policies can be applied to voicemails and/or emails thereby effecting management and retention of the content.

Button Profiles—The subject invention provides for functionality that integrates novel button profile definition mechanisms.

Spoken Password Voicemail Authentication—The invention can employ a secure spoken password to access a voicemail and/or email mailbox through a telephone. This audible authentication is a novel use of the authentication technology.

End-User Configuration of Menus and Prompts—The subject invention provides for the ability to customize end-user menus and prompts.

Figure 9:
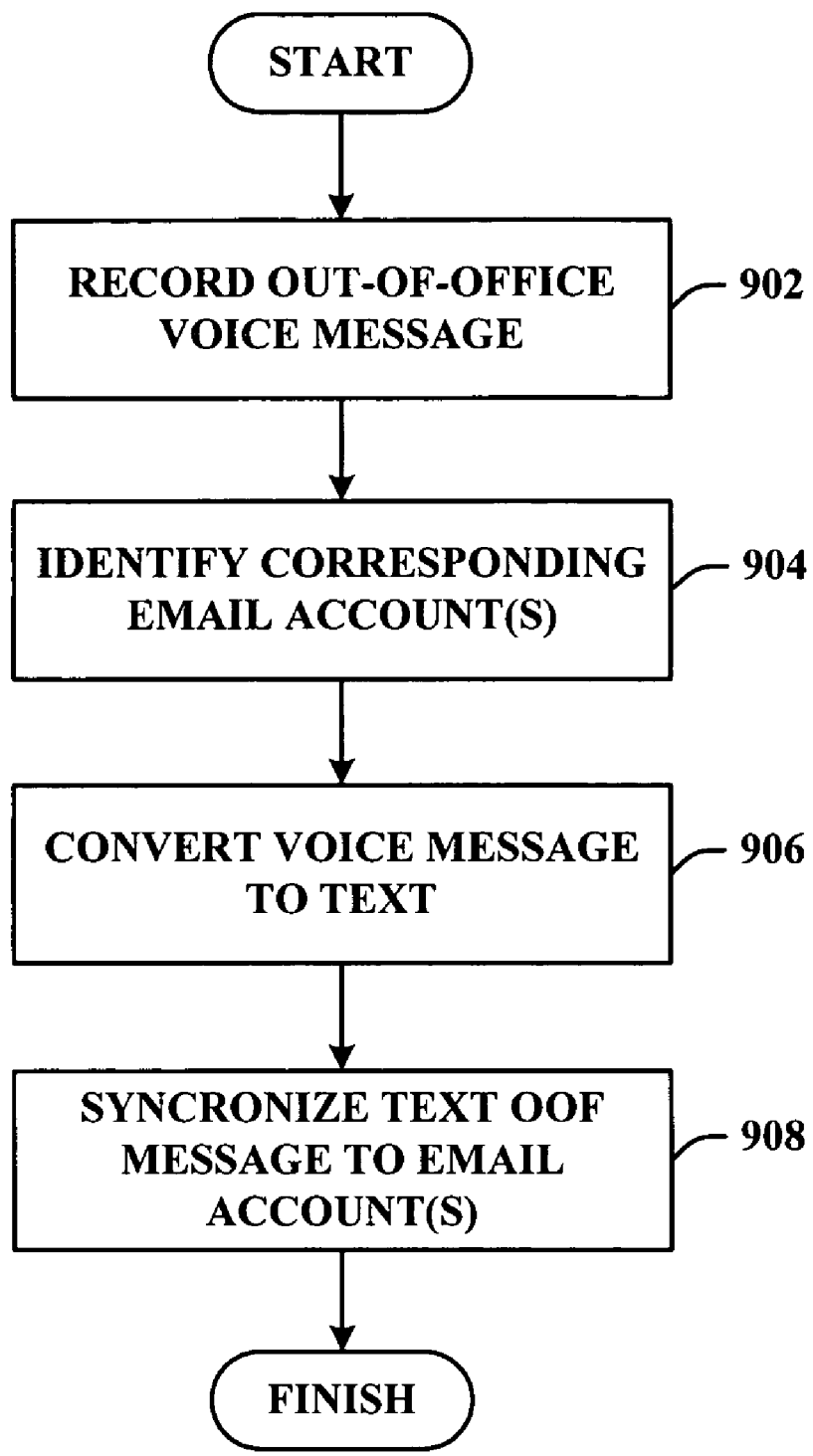
FIG. 9 illustrates a flow diagram of an exemplary communication methodology in accordance with a disclosed aspect.

FIG. 9 illustrates an exemplary flow chart of acts to employ an OOF voice message to set an email OOF notification. While, for purposes of simplicity of explanation, the one or more methodologies shown herein, e.g., in the form of a flow chart or diagram, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 902, an audible OOF message is recorded. The system can identify corresponding email account(s) at 904. Once identified, conversion can begin. At 906, the audible OOF message can be converted to a text OOF message. Accordingly, at 908, the text OOF message can be applied to the identified email account(s). Thus, although different format (e.g., voicemail vs. email), the content of the OOF can be replicated to the disparate system. Although the methodology of FIG. 9 illustrates a process that can convert a voicemail OOF into an email OOF, it is to be understood that an alternate novel aspect of the subject invention can be employed to convert an email OOF into a voicemail system.

As described supra, it is to be appreciated that the aforementioned novel aspects of the invention can employ rule-based logic and/or AI reasoning technology to effect, predict and/or infer an action. More particularly, it will be appreciated that the subject invention (e.g., in connection with content analysis, content retention policy, synchronization, voice recognition) can employ various rule-based and/or AI-based schemes for carrying out various aspects thereof.

Figure 10:
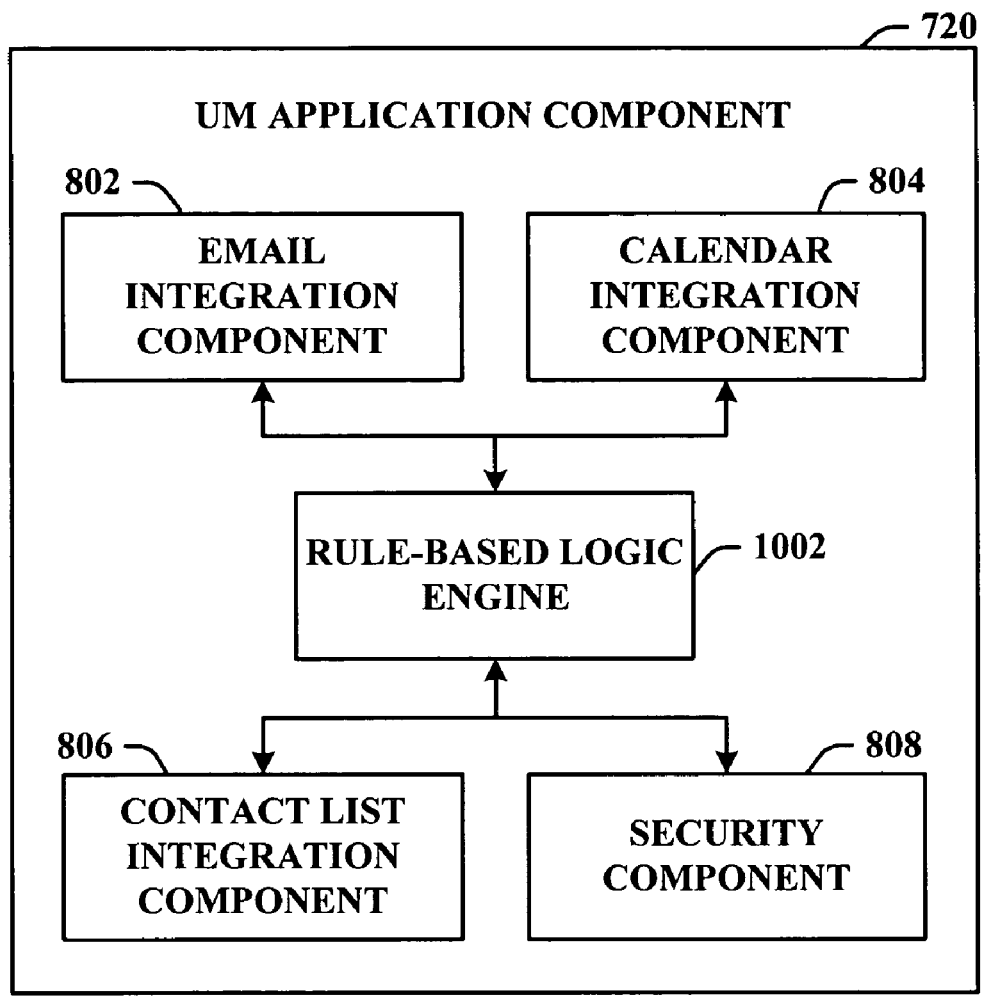
FIG. 10 illustrates a call control component that employs a rule-based logic engine in accordance with a disclosed aspect.

Continuing with the above described scenarios and with reference to FIG. 10, a block schematic view of an alternative UM application component 720 is shown. As illustrated, UM application component 720 can include a rule-based logic engine 1002. As will later be described with reference to FIG. 11, an optional AI component (not shown) can be used together with, or in place of, the rule-based logic engine 1002 to automatically infer an action or set of actions to be employed in connection with the functionality of the UM application component 720 (and UM system 602) described supra.

In the exemplary aspect of FIG. 10, the rule-based logic engine 1002 can be programmed or configured in accordance with a predefined preference (e.g., rule). For example, a rule (e.g., logic) can be constructed to automatically prioritize emails based upon a defined hierarchy. In accordance therewith, the emails can be converted and read to a user in a prioritized order. More particularly, a rule can be established to take into consideration the subject, sender identification, recipient identification, etc., to prioritize and process emails. In another aspect, a rule can be established to predetermine or define a policy whereby emails and/or voicemails can be managed (e.g., retained, forwarded, deleted) in accordance with the policy.

Figure 11:
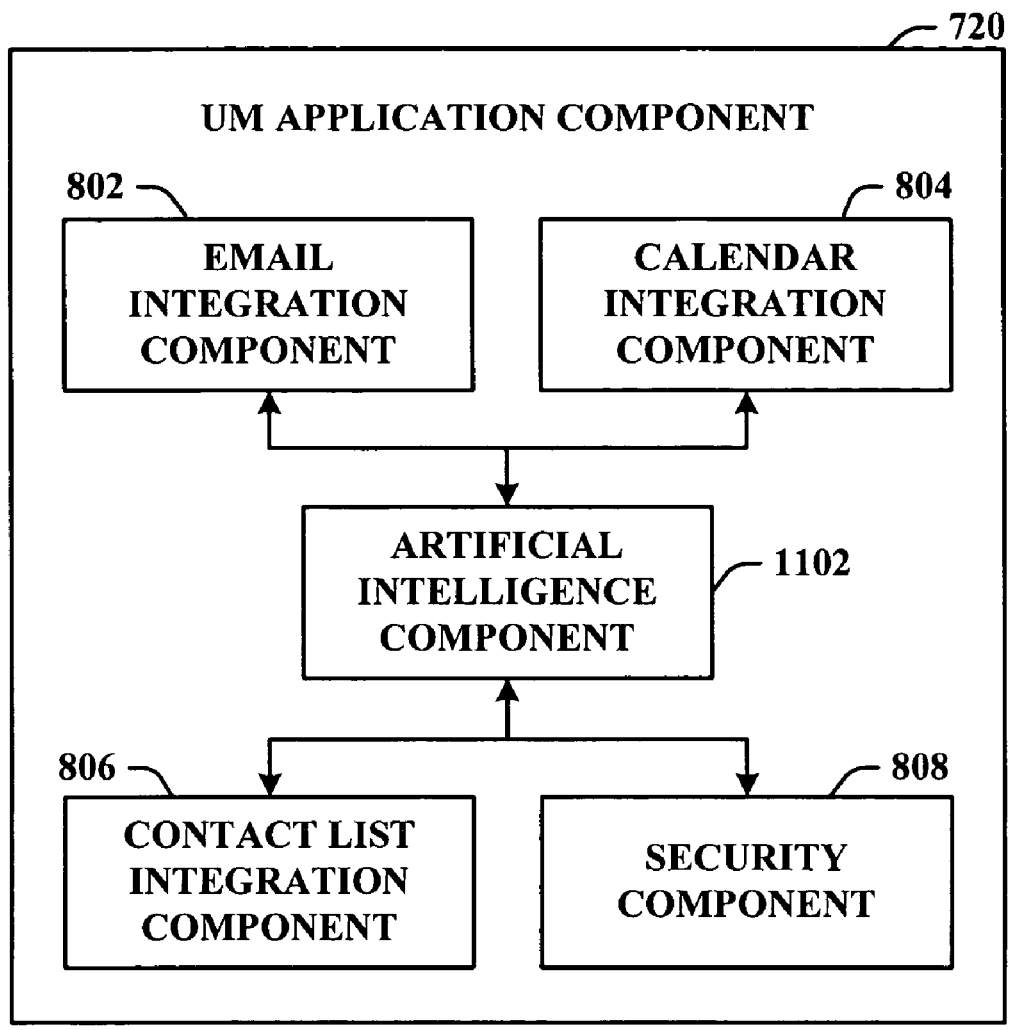
FIG. 11 illustrates a call control component that employs an artificial intelligence component in accordance with an aspect.

A schematic diagram of another alternative aspect of the subject invention is illustrated in FIG. 11. The UM application component 720 of this alternative aspect illustrated in FIG. 11 employs an optional AI component 1102 that can automatically infer and/or predict an action. This alternative aspect can optionally include an inference module (not shown) that facilitates automatic control and/or operation of the UM application component 720.

In accordance with this aspect, the optional AI component 1102 can facilitate automatically performing various aspects (e.g., analysis and prioritization of content, content retention policy, synchronization, voice recognition) of the subject invention as described herein. The AI component 1102 can optionally include an inference component (not shown) that can further enhance automated aspects of the AI component utilizing, in part, inference based schemes to facilitate inferring intended actions to be performed at a given time and/or state. The AI-based aspects of the invention can be effected via any suitable machine-learning based technique and/or statistical-based techniques and/or probabilistic-based techniques.

In the alternate aspect, as further illustrated by FIG. 11, the subject invention (e.g., in connection with content analysis, content retention policy, synchronization, voice recognition) can optionally employ various artificial intelligence based schemes for automatically carrying out various aspects thereof. Specifically, the AI component 1102 can optionally be provided to implement aspects of the subject invention based upon AI processes (e.g., confidence, inference). For example, a process for determining the prioritization of content in an email based upon user preferences or sender identification can be facilitated via an automatic classifier system and process. Further, the optional AI component 1102 can be employed to facilitate an automated process of rendering prioritized content to a user based upon a predicted and/or inferred preference.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc., are contemplated and are intended to fall within the scope of the hereto appended claims.

Illustrated in FIGS. 12 to 16 are flow diagrams of an exemplary user interface (UI) of a UM system in accordance with an aspect of the invention. As described supra, this UM system can facilitate management of voicemail, email and faxes stored in a server mailbox. The subject invention facilitates access to and management of this information from a telephone UI. In accordance with the UI, users are able to access their voicemail and other useful information from the telephone in lieu of accessing a desktop computer or handheld device.

In accordance with the invention, FIGS. 12 to 16 are illustrative examples of a DTMF process flow in accordance with a disclosed aspect. Similarly, FIGS. 17 to 21 are illustrative examples of a speech activated process flow in accordance with a disclosed aspect. As described supra, it is to be appreciated that the DTMF and speech recognition interfaces can be active concurrently with respect to UM system navigational mechanisms.

Following are exemplary scenarios that this invention can address. In the first scenario, suppose a user is headed to a meeting in a remote location, but is not sure which room in the building the meeting will be held. The user may want to quickly find this information while driving his car toward the meeting. One aspect of this invention can facilitate telephonic retrieval of this information.

In another scenario, suppose a user is actually late to a meeting and desires to call into the conference room to participate over the phone before getting there. Here, the user can telephonically access the meeting location information and subsequently be transferred to the meeting location.

In a third scenario, suppose a user is driving to work in the morning and wants to get a head start on the some of the issues that are pending in emails or voicemails. From the telephone UI, the user can quickly review the different issues, reply as desired, and follow-up with the people involved with the issues.

In a final exemplary scenario, suppose a user is in a hotel room without access to a printer and wishes to send emails as well as calendar appointments for the following day to the hotel fax so that the user can review materials and plan the day. One aspect of the invention facilitates this functionality via a telephonic connection. The procedure flow of these and other aspects will be better understood upon a review of FIGS. 12 to 16 that follow.

Figure 12:
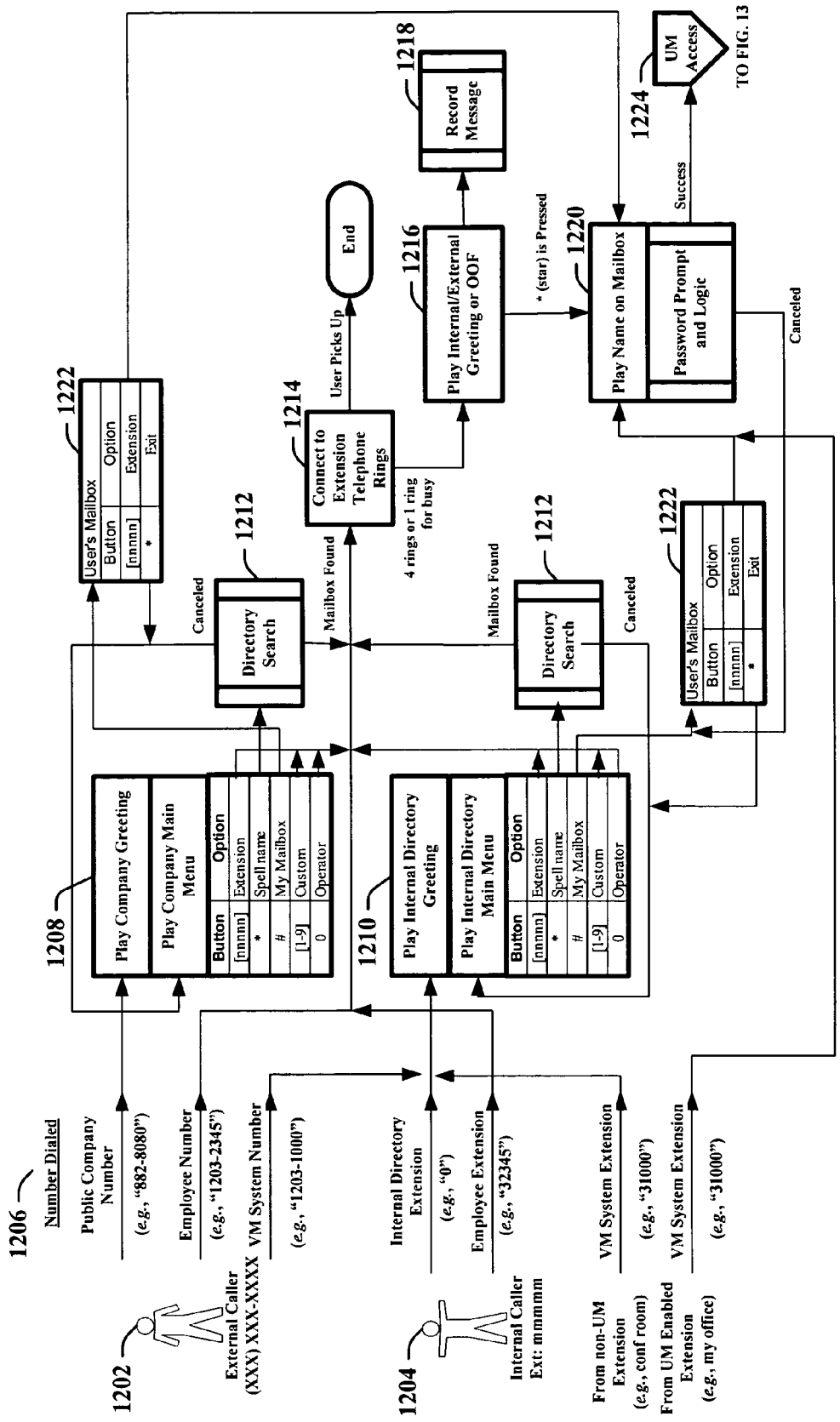
FIG. 12 is an exemplary flow diagram of calling into a unified messaging system in accordance with a disclosed aspect.

Referring now to FIG. 12, an exemplary process task flow diagram of calling into a UM is shown. The process illustrates a flow of procedures in accordance to a call initiated by an external caller 1202 and an internal caller 1204. As illustrated, the process flow of the exemplary aspect is dependent upon the type of caller (e.g., external 1202 or internal 1204) as well as the contact number dialed at 1206. An external caller will be prompted with the company information at 1208 whereby an internal caller with internal information at 1210.

In each scenario, a caller can contact a user located on the system by spelling the name and employing the directory search at 1212 or by connecting directly to the extension (1214) by entering the numeric extension. If the user does not answer, at 1216, the system can play the appropriate greeting (e.g., external, internal, OOF) in accordance with the type of caller. Accordingly, a voicemail message can be recorded at 1218. If a pre-designated key (e.g., "*") is pressed, the system can enter the callee mailbox at 1220.

Figure 13:
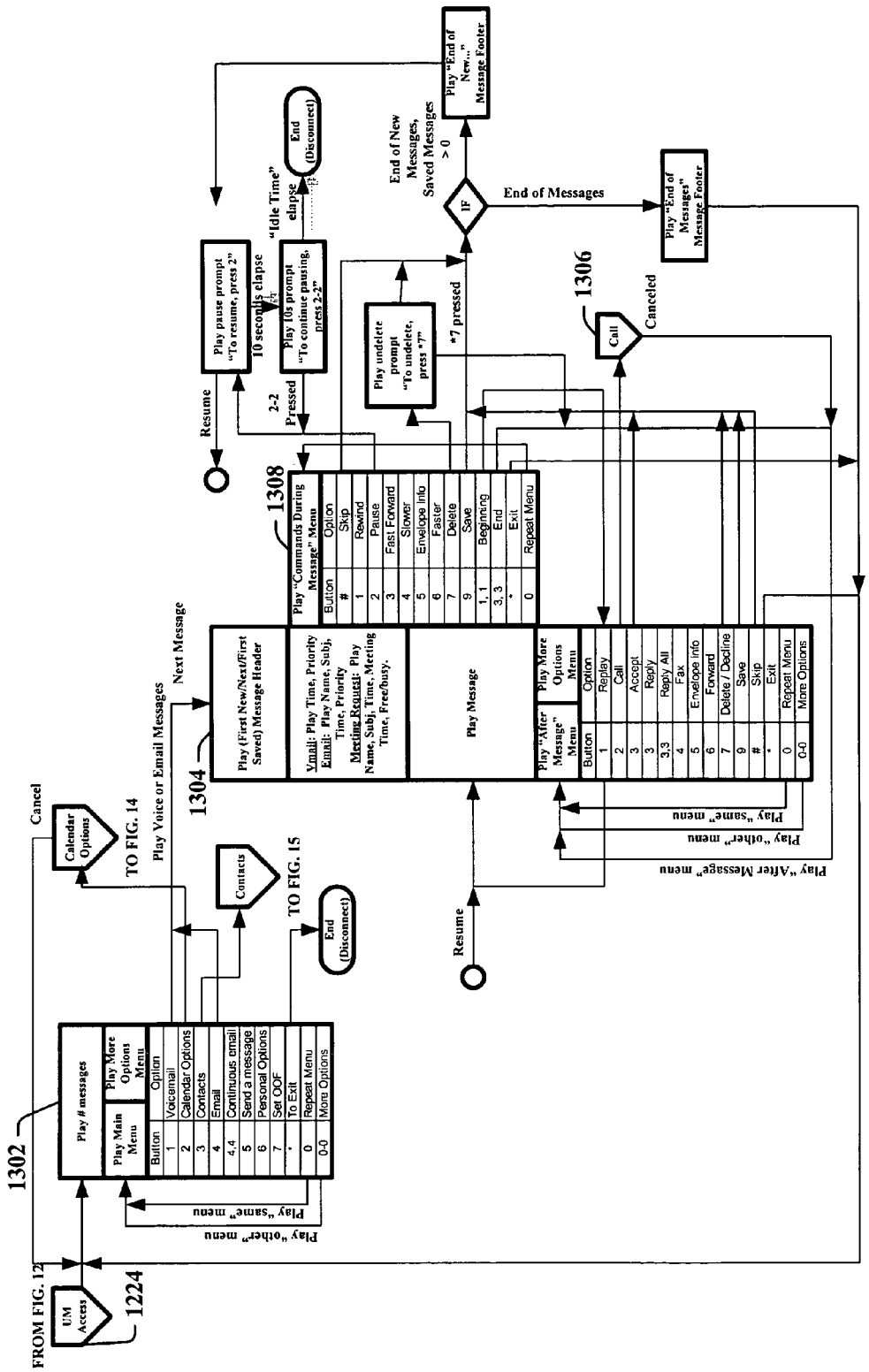
FIG. 13 is an exemplary flow diagram of accessing voicemail and email in accordance with an aspect.

It is to be appreciated that the callee can access the mailbox directly from 1220 by choosing a pre-designated key (e.g., "#") from the company and/or internal greeting menu (1208, 1210). This direct access will prompt the callee for necessary information at 1222. In each case, once the appropriate security credential information is entered at 1220, access to the UM is gained at 1224. FIG. 13 illustrates a continued procedure flow diagram once access is granted.

Referring now to FIG. 13, once access to the UM is granted at 1224, the user can be prompted with a main menu at 1302. By way of example, the user can be prompted to press "1" for voicemail, "2" for calendar options, "3" for contacts, "4" for email and so on. Option numbers "2" and "3", e.g., calendar options and contacts, will be discussed in greater detail with reference to FIGS. 14 and 15 respectfully. By way of further example, a user can choose "5" to send a message (e.g., voicemail, email) or "7" to set an OOF. Additional exemplary menu choices are illustrated in block 1302.

As shown, if voicemail or email is chosen the system proceeds to 1304 whereby content can be presented to the user. In other words, the user can be presented with voicemail, email and/or meeting request content. It is to be appreciated that logic and reasoning mechanisms can be employed to manage, organize, filter and/or sort the content as described supra. As illustrated, once the content is presented, the user can be presented with an "after message" menu thereby presenting additional options. By way of example, by pressing "4" a user can send a facsimile of a desired message. In other words, once a user listens to a voicemail and/or TTS converted email, the user can opt to send a facsimile of the message to a desired location. As well, by pressing "3", the user can reply to the message or accept a meeting appointment request. By choosing option "2", a user can call the sender of a particular message at 1306. This "call" option will be discussed in greater detail with reference to FIG. 15. It is to be appreciated that the options shown in the UI process flow of FIG. 13 are exemplary and are not intended to be an exhaustive list of options available to a user.

At 1308, a list of exemplary play commands, which are presented during playback of a message, are shown. Again, this list is not intended to be exhaustive in view of the functionality described herein. As illustrated, it will be appreciated that the system can effect a pause, undelete, repeat, etc., task in accordance with options shown at 1306.

Figure 14:
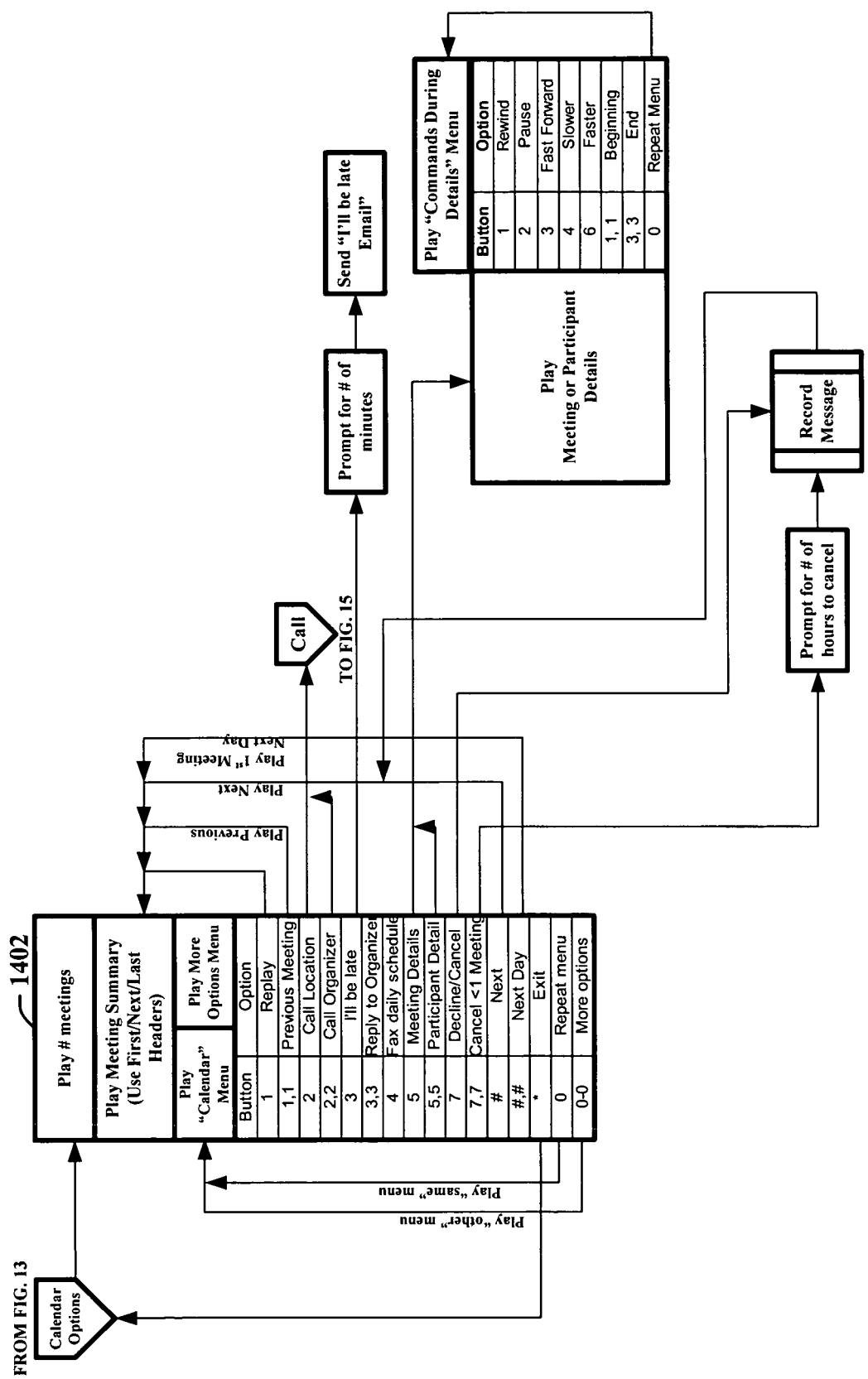
FIG. 14 is an exemplary flow diagram of accessing an electronic calendar in accordance with an exemplary aspect.

Turning now to FIG. 14, an exemplary flow diagram of calendar access is shown. At 1402, the system can play the number of pending meetings. As well, as illustrated at 1402, the user can manage the meeting appointments and/or requests by selecting any of various options. For example, the user can select option "2" to call the meeting location, "2,2" to call the meeting organizer or "3" to indicate a late arrival to the subject meeting. As well, additional navigational options can be presented to the user as illustrated.

Figure 15:
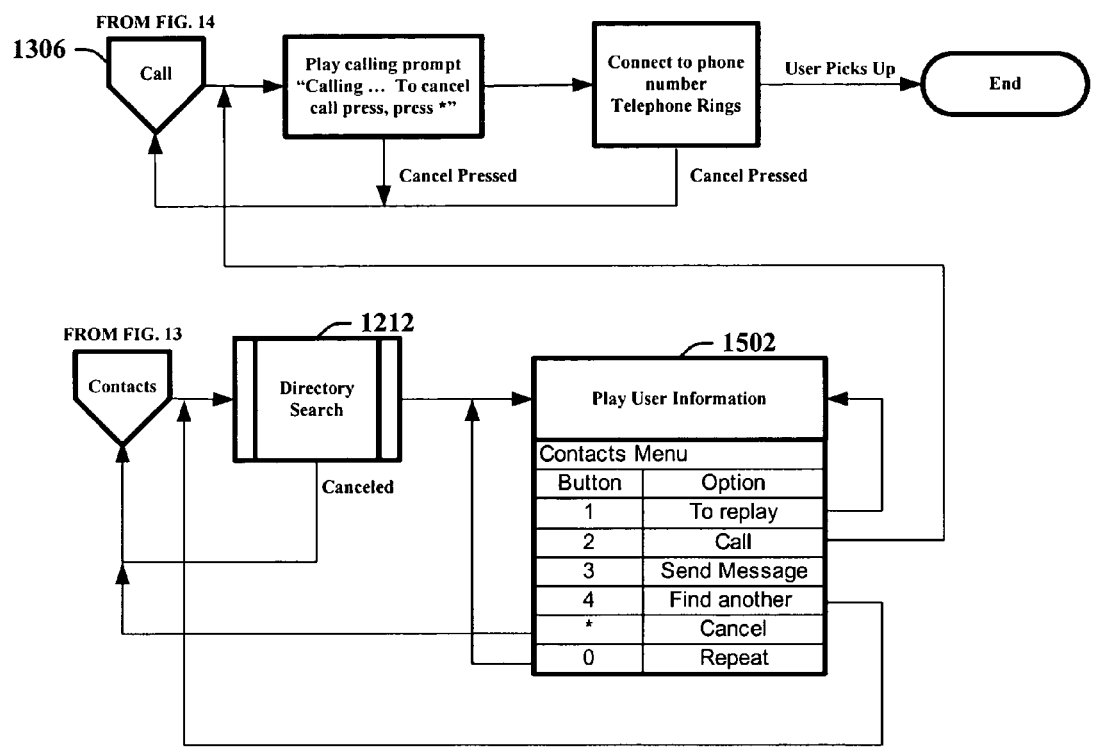
FIG. 15 is an exemplary flow diagram of accessing electronic contacts in accordance with a disclosed aspect.

FIG. 15 illustrates an exemplary process flow to effect generating a call from the contacts menu. It is to be appreciated that a call can also be generated in accordance with a meeting request/appointment or a received communication. Referring again to FIG. 15, once a contact is located via the directory search at 1212, the system can present user information at 1502. The information presented at 1502 can effect any desired task. By way of example, the user can call or send a message to the contact by pressing "2" or "3" respectively. If the user chooses to call, the process continues to generate the call as illustrated.

Figure 16:
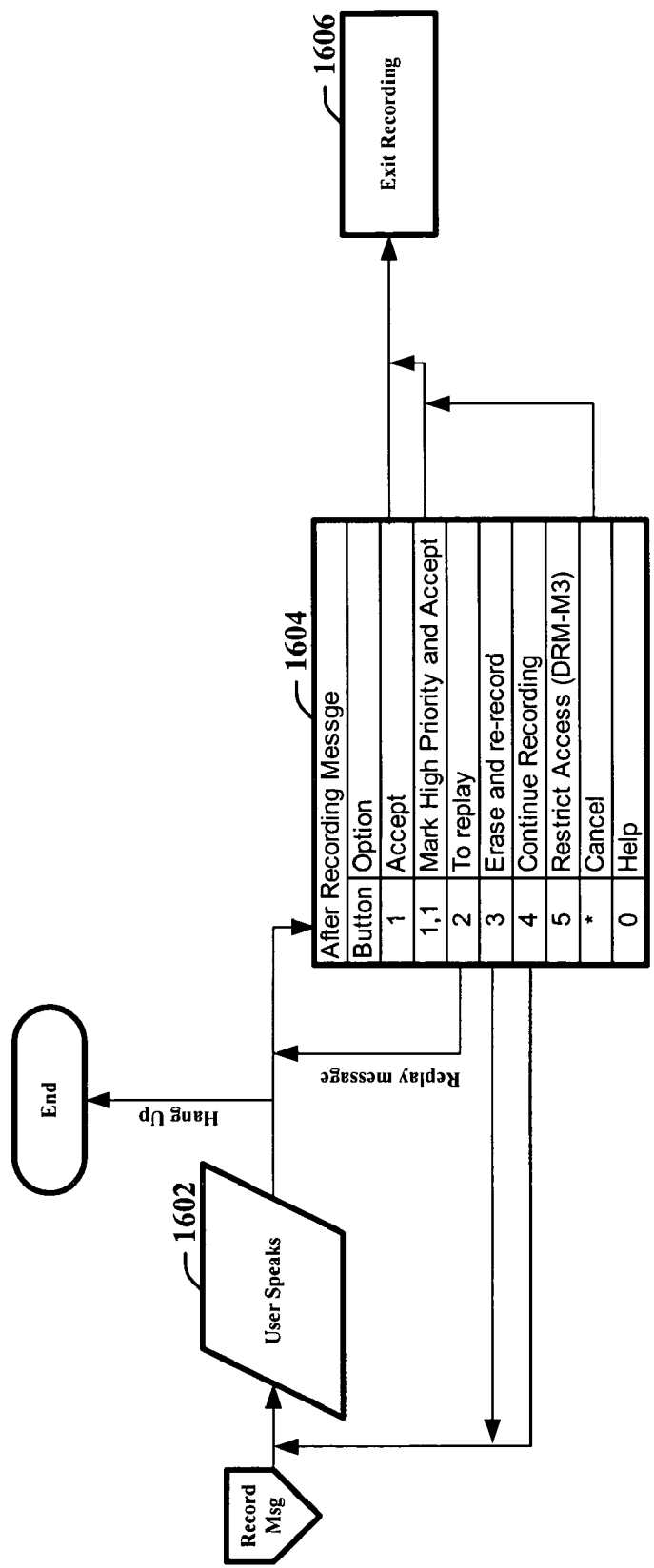
FIG. 16 is an exemplary flow diagram of recording a message in accordance with a disclosed aspect.

Illustrated in FIG. 16 is a process flow diagram to record a message. The message is recorded at 1602. At 1604, the user is presented with a variety of options to manage the recording. For example, the user can mark the message with high priority by depressing "1,1" or restrict access by depressing "5". Once complete, the user can exit the system at 1606.

FIGS. 17 to 21 illustrate exemplary process flow diagrams of a UM system that employs a speech UI. As described supra, a user can selectively employ disparate navigational mechanisms with respect to the application state machine (e.g., UM system). The process flow diagrams of FIGS. 17 to 21 illustrate the co-existence of the DTMF UI (FIGS. 12 to 16) and a speech activated UI. It is to be understood that a user can employ any available UI at any time in connection with navigating within an application state machine.

Figure 17:
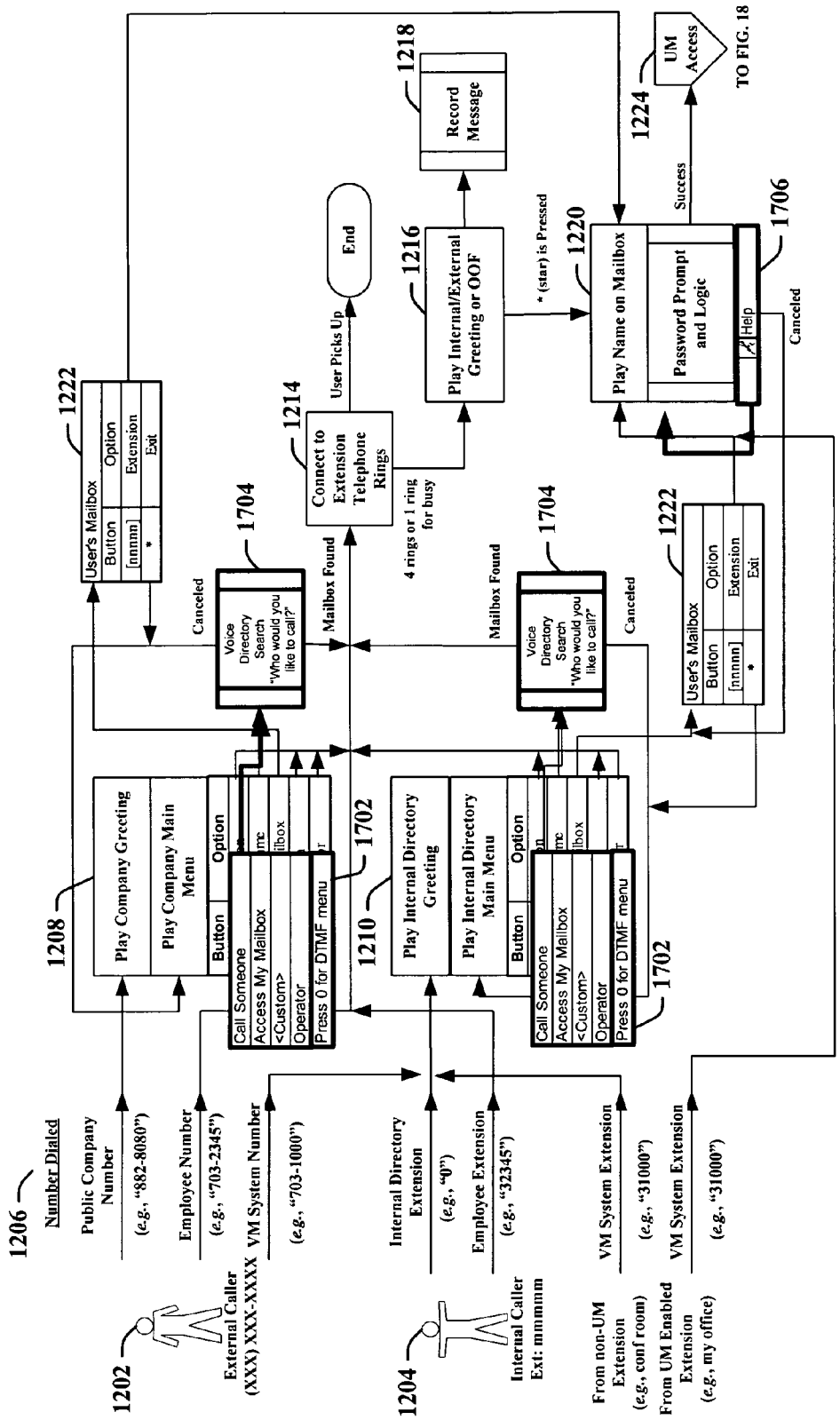
FIG. 17 is an exemplary flow diagram of calling into a unified messaging system that employs voice commands in accordance with a disclosed aspect.

Referring now to FIG. 17, an exemplary process task flow diagram of calling into a UM system is shown. As discussed with reference with FIG. 12, the process illustrates a flow of procedures in accordance to a call initiated by an external caller 1202 and an internal caller 1204. As illustrated, the process flow of the exemplary aspect is dependent upon the type of caller (e.g., external 1202 or internal 1204) as well as the contact number dialed at 1206. An external caller will be prompted with the company information at 1208 whereby an internal caller with internal information at 1210.

Figure 18:
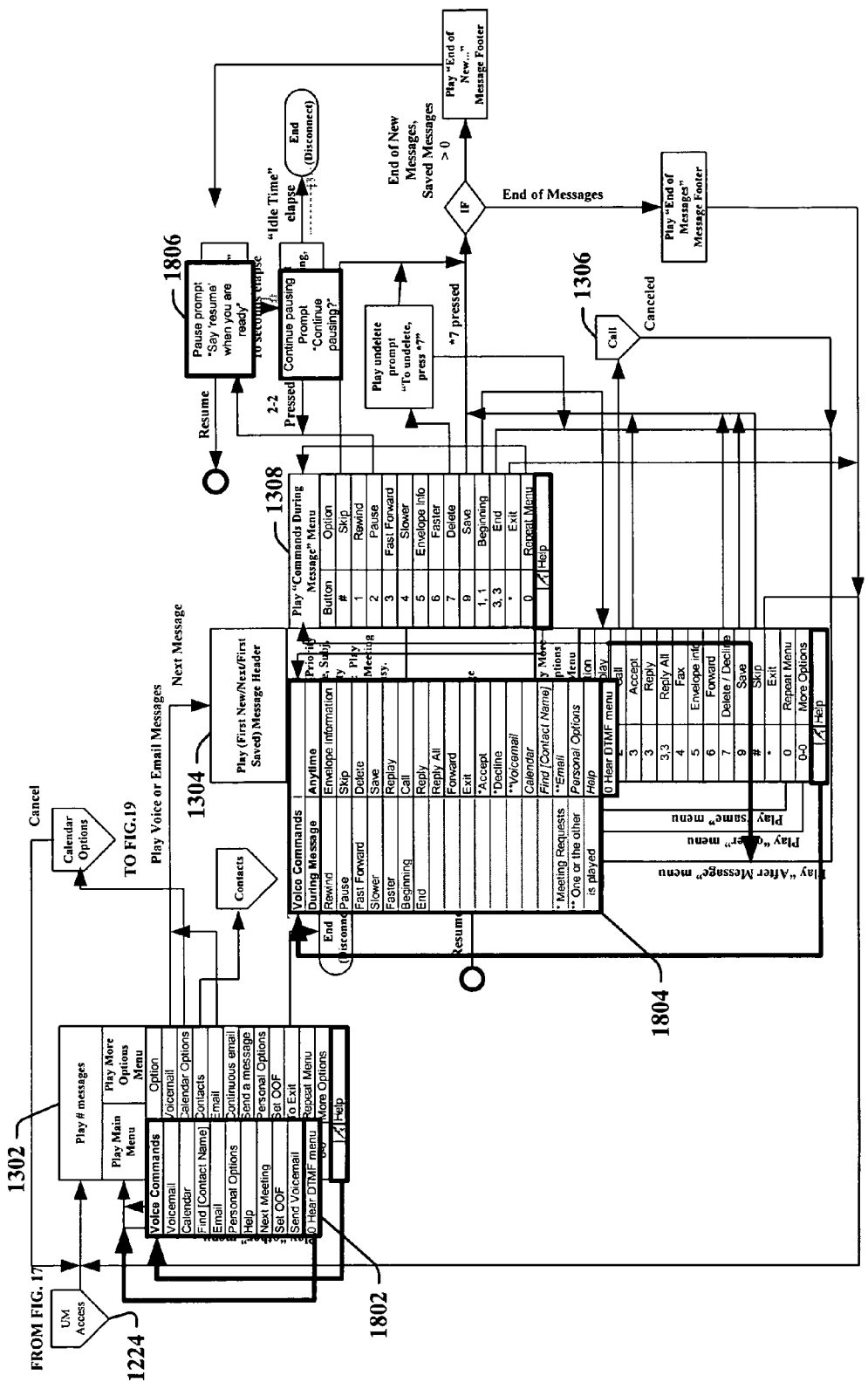
FIG. 18 is an exemplary flow diagram of accessing voicemail and email that employs voice commands in accordance with an aspect of the invention.

In each scenario, a caller can contact a user located on the system by employing the directory search (1212 of FIG. 12) or by connecting directly to the extension (1214) by entering the numeric extension. As illustrated in FIG. 17, the user can speak commands at 1702 to effect a desired option. As well, at 1704, the user can verbally instruct the system of a desired target person to contact. At any time, a user can speak the word "help" (1706) to access available system options. FIG. 18 illustrates a continued procedure flow diagram that includes voice options once access is granted.

Referring now to FIG. 18, once access to the UM system is granted at 1224, the user can be prompted with a main menu at 1302. By way of example, the user can be prompted to press "1" for voicemail, "2" for calendar options, "3" for contacts, "4" for email and so on. By way of further example, a user can choose "5" to send a message (e.g., voicemail, email) or "7" to set an OOF. Additional exemplary DTMF menu choices are illustrated in block 1302. As well, if desired, voice commands can be employed at 1802 in order to effect navigation.

As shown, if voicemail or email is chosen the system proceeds to 1304 whereby content can be presented to the user. In other words, the user can be presented with voicemail, email and/or meeting request content. It is to be appreciated that logic and reasoning mechanisms can be employed to manage, organize, filter and/or sort the content as described supra. As illustrated, once the content is presented, the user can be presented with an "after message" menu thereby presenting additional options. By way of example, by pressing "4" a user can send a facsimile of a desired message. In other words, once a user listens to a voicemail and/or TTS converted email, the user can opt to send a facsimile of the message to a desired location. As well, by pressing "3", the user can reply to the message or accept a meeting appointment request. By choosing option "2", a user can call the sender of a particular message at 1306. It is to be appreciated that the options shown in the UI process flow of FIG. 18 are exemplary and are not intended to be an exhaustive list of options available to a user.

It will further be appreciated that the voice commands shown at 1804 can be employed "during" or "after message" playback. In other words, the voice commands can be reused in either scenario. These reusable commands are listed on FIG. 18 as "anytime" commands.

At 1308, a list of exemplary DTMF play commands, which are presented during playback of a message, are shown. Again, this list is not intended to be exhaustive in view of the functionality described herein. As illustrated, it will be appreciated that the system can effect a pause, undelete, repeat, etc., task in accordance with options shown at 1308. In one aspect at 1806, speech commands and options can be employed in connection with pausing a playback.

Figure 19:
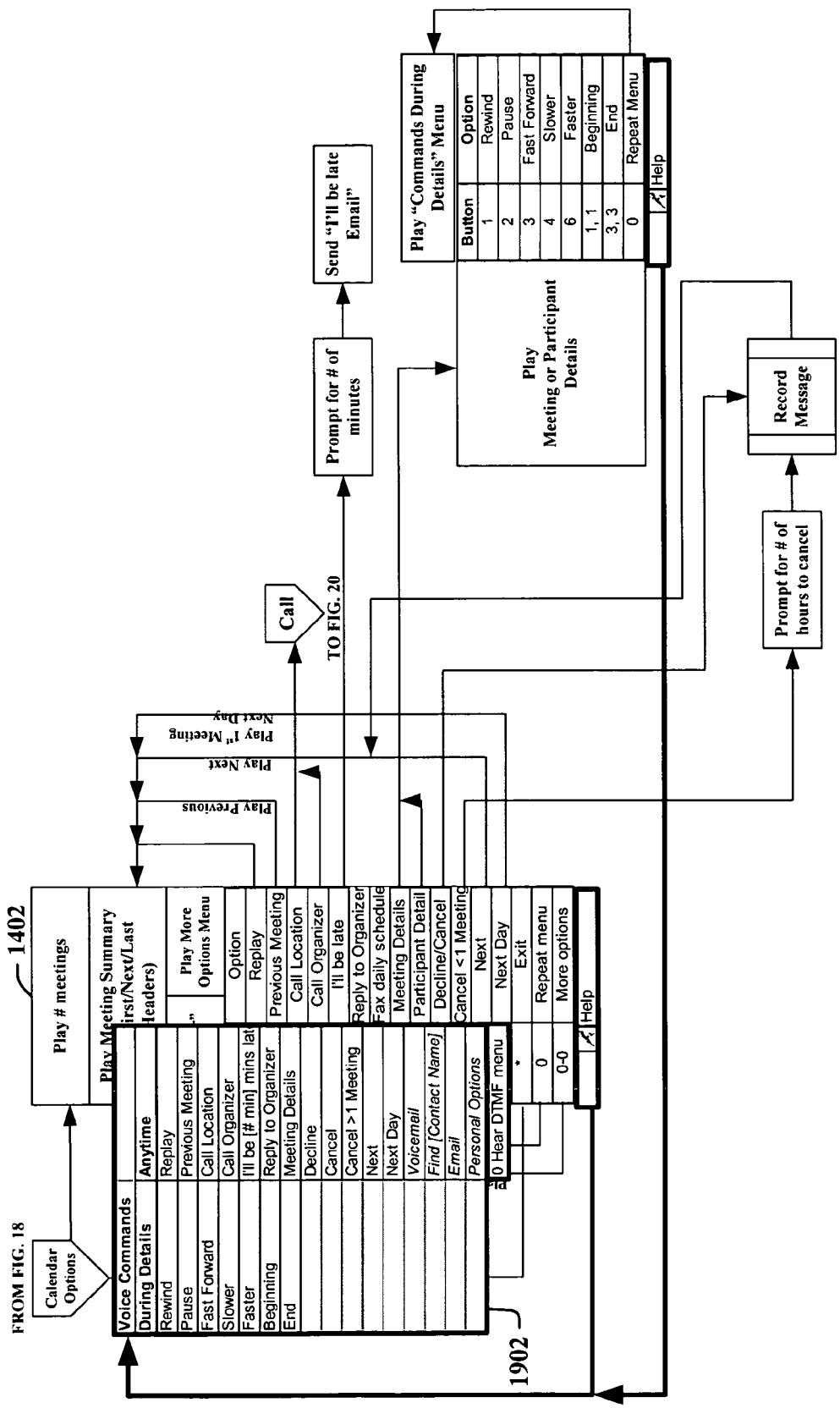
FIG. 19 is an exemplary flow diagram of accessing an electronic calendar that employs voice commands in accordance with a disclosed aspect.

Turning now to FIG. 19, an exemplary flow diagram of calendar access is shown. At 1402, the system can play the number of pending meetings. As well, as illustrated at 1402, the user can manage the meeting appointments and/or requests by selecting any of various options. For example, the user can select option "2" to call the meeting location, "2,2" to call the meeting organizer or "3" to indicate a late arrival to the subject meeting. As well, additional navigational options can be presented to the user as illustrated. For example, as illustrated, a user can employ speech commands at 1902 to effect calendar playback.

Figure 20:
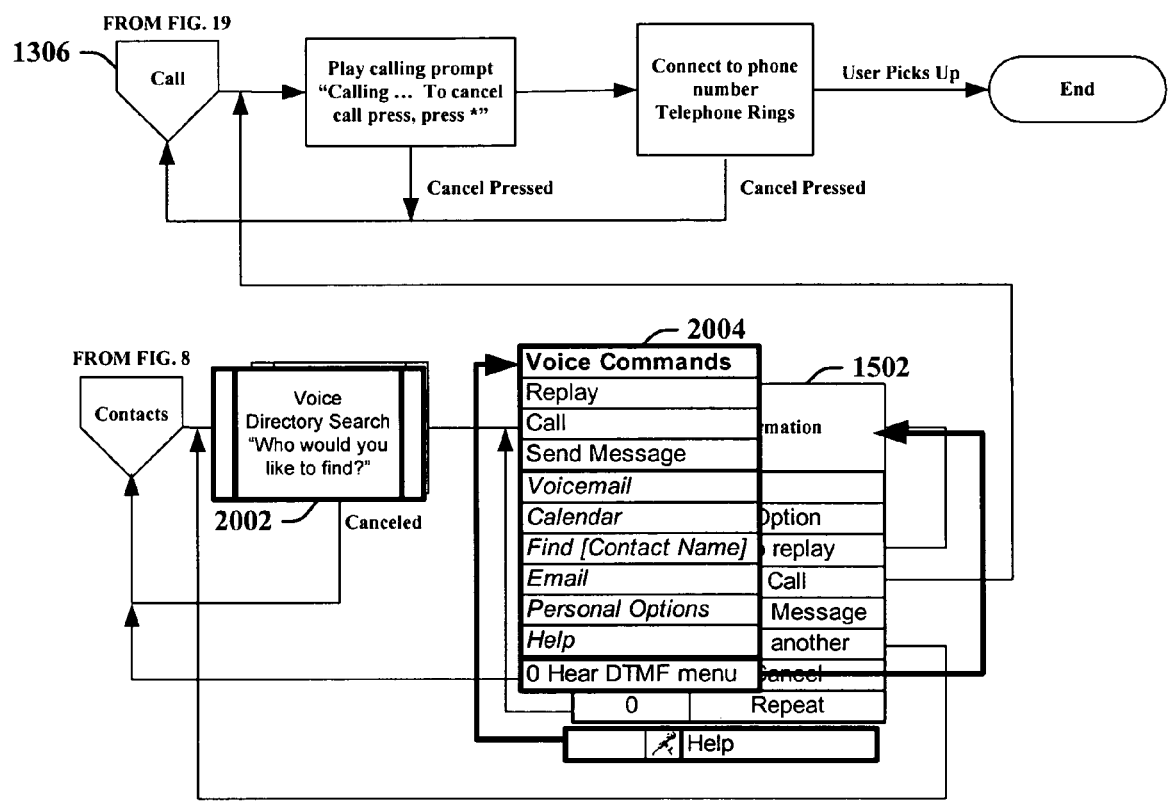
FIG. 20 is an exemplary flow diagram of accessing electronic contacts that employs voice commands in accordance with a disclosed aspect.

FIG. 20 illustrates an exemplary process flow to effect generating a call from the contacts menu. It is to be appreciated that a call can also be generated in accordance with a meeting request/appointment or a received communication. Referring again to FIG. 20, once a contact is verbally located via the directory search at 2002, the system can present user information at 1502. The information presented at 1502 can effect any desired task. By way of example, the user can call or send a message to the contact by pressing "2" or "3" respectively. If the user chooses to call, the process continues to generate the call as illustrated. Additionally, at 2004, the user can effect communication with a contact by employing speech commands. For example, the user can audibly instruct the system to "find" a particular person. Next, the user can audibly tell the system to send an email message to the located contact.

Figure 21:
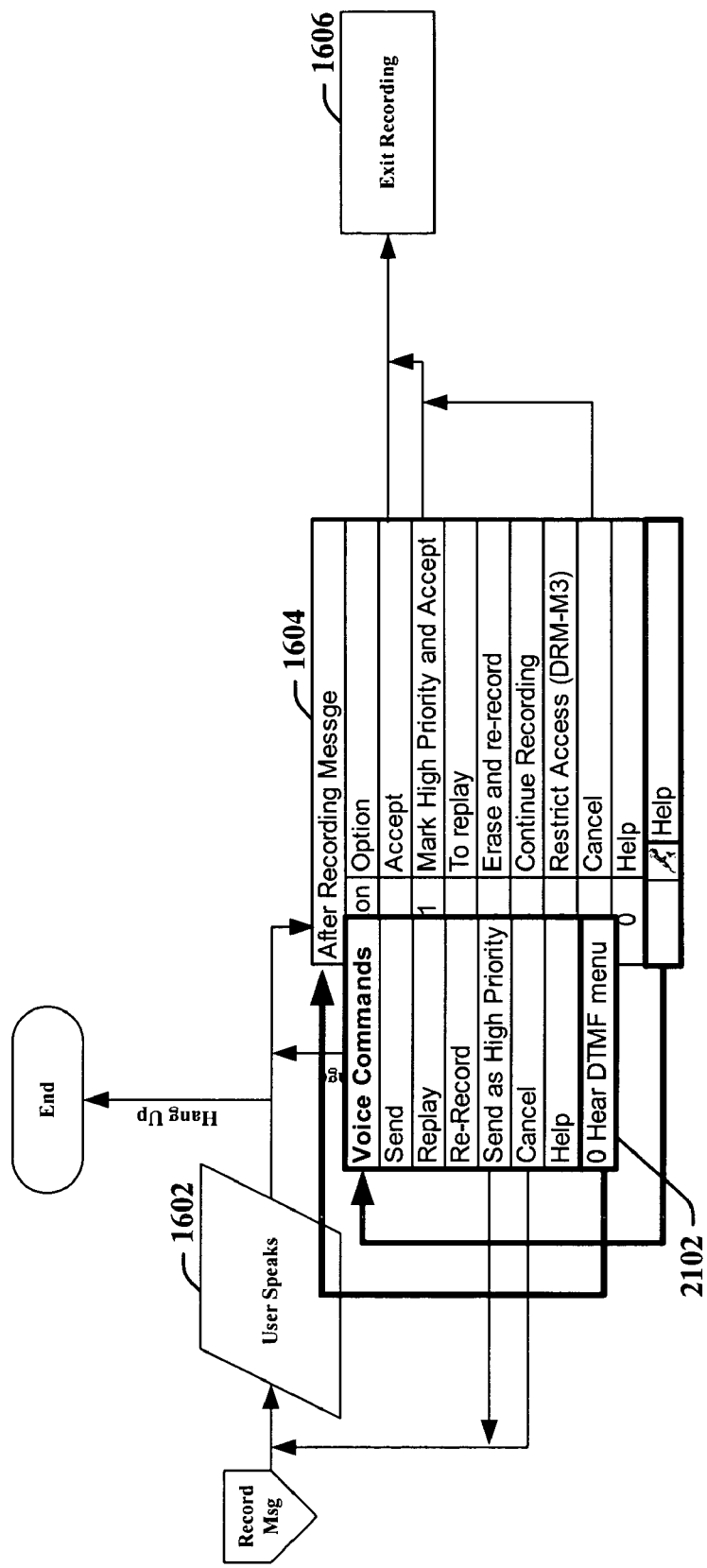
FIG. 21 is an exemplary flow diagram of recording a message that employs voice commands in accordance with a disclosed aspect.

Illustrated in FIG. 21 is a process flow diagram to record a message. The message is recorded at 1602. At 1604, the user is presented with a variety of options to manage the recording. For example, the user can mark the message with high priority by depressing "1,1" or restrict access by depressing "5". Once complete, the user can exit the system at 1606. As discussed with respect to the other exemplary flow diagrams, a user at any time can opt to communicate with the system via another available UI (e.g., speech recognition). In the example of FIG. 21, the user can speak the commands identified at 2102 thus navigating through the application state machine (e.g., UM system).

Figure 22:
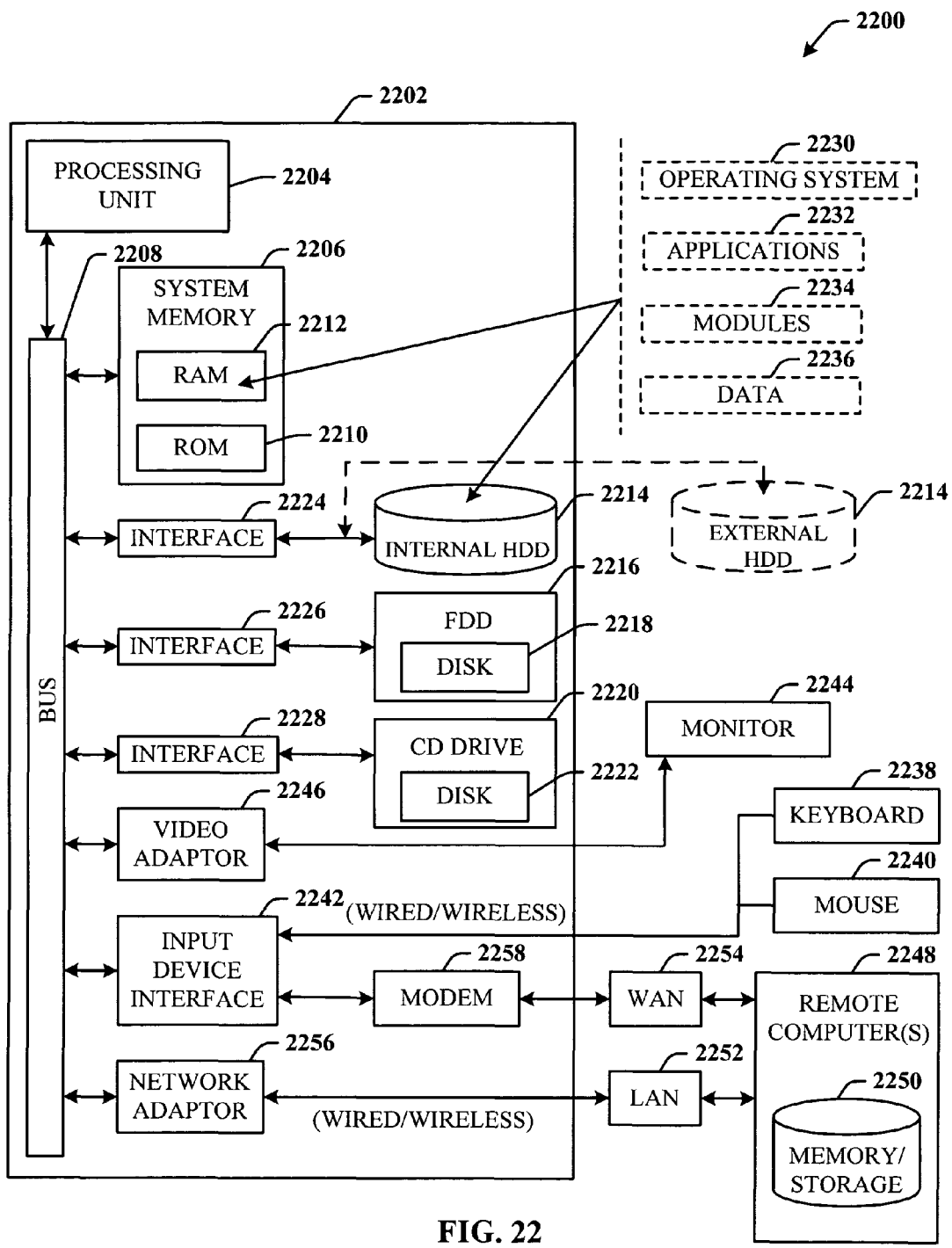
FIG. 22 illustrates a block diagram of a computer that can execute the disclosed architecture.

Referring now to FIG. 22, there is illustrated a block diagram of a computer operable to execute the disclosed architecture. In order to provide additional context for various aspects of the subject invention, FIG. 22 and the following discussion are intended to provide a brief, general description of a suitable computing environment 2200 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 22, there is illustrated an exemplary environment 2200 for implementing various aspects of the invention that includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is appreciated that the subject invention can be implemented with various commercially available operating systems or combinations of operating systems.

A user can enter commands and information into the computer 2202 through one or more wired/wireless input devices, e.g., a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2202 is connected to the local network 2252 through a wired and/or wireless communication network interface or adapter 2256. The adaptor 2256 may facilitate wired or wireless communication to the LAN 2252, which may also include a wireless access point disposed thereon for communicating with the wireless adaptor 2256. When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 23:
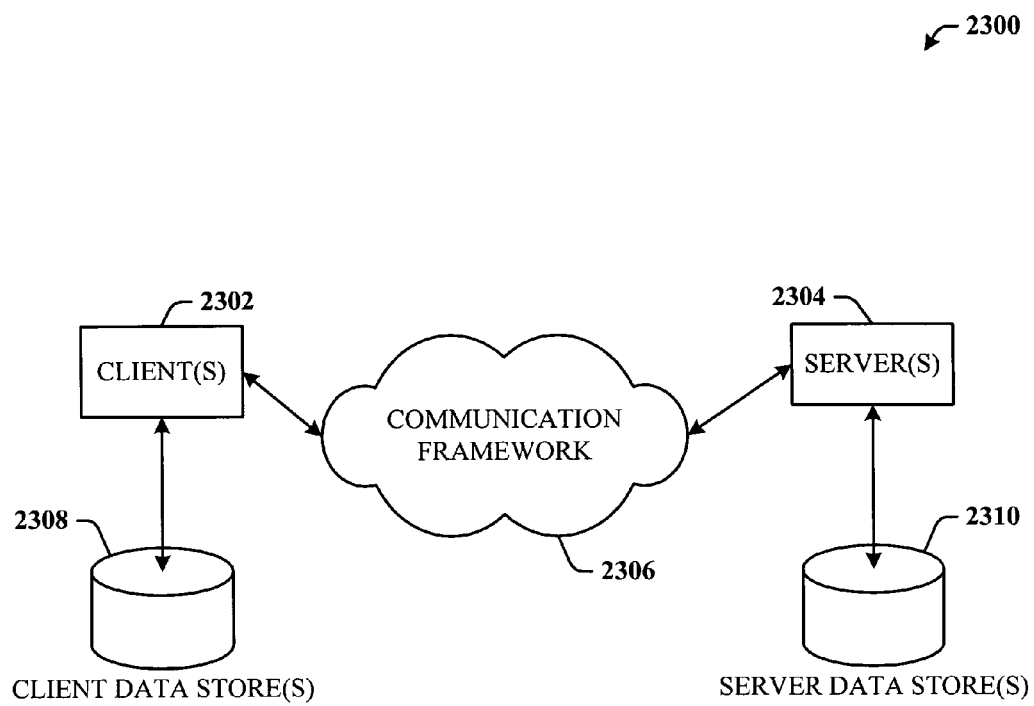
FIG. 23 illustrates a schematic block diagram of an exemplary computing environment in accordance with the subject invention.

Referring now to FIG. 23, there is illustrated a schematic block diagram of an exemplary computing environment 2300 in accordance with the subject invention. The system 2300 includes one or more client(s) 2302. The client(s) 2302 can be hardware and/or software (e.g., threads, processes, computing devices). The client(s) 2302 can house cookie(s) and/or associated contextual information by employing the subject invention, for example. The system 2300 also includes one or more server(s) 2304. The server(s) 2304 can also be hardware and/or software (e.g., threads, processes, computing devices). The servers 2304 can house threads to perform transformations by employing the subject invention, for example. One possible communication between a client 2302 and a server 2304 can be in the form of a data packet adapted to be transmitted between two or more computer processes. The data packet may include a cookie and/or associated contextual information, for example. The system 2300 includes a communication framework 2306 (e.g., a global communication network such as the Internet) that can be employed to facilitate communications between the client(s) 2302 and the server(s) 2304.

Communications can be facilitated via a wired (including optical fiber) and/or wireless technology. The client(s) 2302 are operatively connected to one or more client data store(s) 2308 that can be employed to store information local to the client(s) 2302 (e.g., cookie(s) and/or associated contextual information). Similarly, the server(s) 2304 are operatively connected to one or more server data store(s) 2310 that can be employed to store information local to the servers 2304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates navigating within an application state machine, the system comprising:
   a processor;
   a user interface store that retains a plurality of user interfaces that are each associated with a different navigation input mechanism and that each have a distinct set of prompts and menus, wherein the plurality of user interfaces are concurrently available during a single navigation session to effect navigation within the application state machine, and wherein the distinct set of prompts and menus includes at least one shortcut accessible at any time during navigation through each of the plurality of user interfaces, the at least one shortcut being associated with at least a calendar application;
   a user interface selection component, executed by the processor, that facilitates selecting one of the plurality of user interfaces at any time during the single navigation session upon receipt of a command through an associated navigation input mechanism to navigate within the application state machine, the selection being based on a type of the navigation input mechanism used to issue the command; and
   a user interface component, executed by the processor, that conveys the distinct set of prompts and menus associated with a selected user interface, wherein the user interface component is configured to provide, upon first entry into the application state machine:
      a default user interface based on a set personal option, and
      a corresponding distinct set of prompts and menus associated with the default user interface, the corresponding distinct set of prompts being cooperative with both: a dual tone multi-frequency input and a microphone input.

2. The system of claim 1, wherein the plurality of user interfaces includes a dual tone multi-frequency user interface and a speech recognition user interface, wherein a first corresponding navigation input mechanism associated with the dual tone multi-frequency user interface includes the dual tone multi-frequency input mechanism, and wherein a second corresponding navigation mechanism associated with the speech recognition user interface includes a microphone.

3. The system of claim 1, wherein the user interface selection component comprises at least one of the following: a rule-based logic component and an artificial intelligence component that infers an action to be employed in connection with a functionality of the selected user interface.

4. The system of claim 1, wherein the application state machine is a unified messaging system, and wherein the command is an enter command to enter a state within the unified messaging system.

5. The system of claim 4, wherein the unified messaging system includes:
   a component that receives from a first device a message of a first format; and
   a unified messaging component that analyzes the message and converts the message to a second format that corresponds to a target device that conveys the message in accordance with a user instruction, the user instruction being transmitted via the currently selected user interface.

6. The system of claim 5, wherein the received message is text based.

7. The system of claim 6, wherein the converted message is audibly based, wherein at least one of the following: a rule-based logic component and an artificial intelligence component, is employed to analyze a content of the received message and identify an important portion of the message for delivery to a user.

8. The system of claim 7, wherein the content of the received message is date and time synchronized with the converted message's content.

9. The system of claim 5, wherein the received message includes schedule information from a calendar application, and wherein the unified messaging component conveys the schedule information to an individual via telephone.

10. The system of claim 5, wherein the unified messaging component receives an audible message from an individual via telephone, reformats the message to yield a reformatted message, and populates a calendar with the reformatted message.

11. The system of claim 10, wherein content of the reformatted message is synchronized with content of the audible message.

12. A computer-readable storage medium having stored thereon computer executable instructions to carry out the system of claim 1.

13. A system that facilitates communicating with an application state machine, the system comprising:
    a memory;
    a processor communicatively coupled to the memory, wherein the processor is operative to:
        present, upon first entry into the application state machine, a default user interface mechanism of a plurality of user interface mechanisms, the default user interface mechanism being based on a set personal option;
        enable, at any point within the application state machine, user interaction with any one of the plurality of user interface mechanisms that facilitate navigating through the application state machine, each of the plurality of user interface mechanisms being associated with a different navigation input mechanism of a plurality of navigation input mechanisms and having a distinct set of prompts and menus, wherein the distinct set of prompts and menus includes at least one shortcut accessible at any time during navigation through each of the plurality of user interfaces, the at least one shortcut being associated with at least a calendar application;
        receive a first navigation command via a first navigation input mechanism of the plurality of navigation input mechanisms;
        select a first user interface mechanism of the plurality of user interface mechanisms based on a first type of the first navigation input mechanism;
        receive an instruction via the first user interface mechanism;
        process the instruction to control the application state machine; and
        switch from the first user interface mechanism to a second user interface mechanism of the plurality of navigation input mechanisms upon receiving a second navigation command via a second navigation input mechanism being a second type different from the first type, the second user interface mechanism being selected based on the second type of the second navigation input mechanism used to issue the second navigation command.

14. A method that facilitates navigating within an application state machine, the method comprising:
    retaining, in a user interface store, a plurality of user interfaces that are each associated with a different navigation input mechanism and that each have a distinct set of prompts and menus, wherein the plurality of user interfaces are concurrently available during a single navigation session to effect navigation within the application state machine, and wherein the distinct set of prompts and menus includes at least one shortcut accessible at any time during navigation through each of the plurality of user interfaces, the at least one shortcut being associated with at least a calendar application;
    selecting, by a user interface selection component executed by a processor, one of the plurality of user interfaces at any time during the single navigation session upon receipt of a command through an associated navigation input mechanism to navigate within the application state machine, the selection being based on a type of the navigation input mechanism used to issue the command; and
    conveying, by a user interface conveying component executed by the processor, the distinct set of prompts and menus associated with a selected user interface, wherein the user interface conveying component is configured to provide, upon first entry into the application state machine:
        a default user interface based on a set personal option, and
        a corresponding distinct set of prompts and menus associated with the default user interface, the corresponding distinct set of prompts being cooperative with both: a dual tone multi-frequency input and a microphone input.

15. The method of claim 14, wherein selecting, by the user interface selection component, comprises selecting, by the user interface selection component, wherein the user interface selection component comprises at least one of the following:
    a rule-based logic component and an artificial intelligence component that infers an action to be employed in connection with a functionality of the selected user interface.

16. The method of claim 14, wherein the application state machine is a unified messaging system, and wherein the command is an enter command to enter a state within the unified messaging system.

17. The method of claim 16, wherein the unified messaging system includes:
    a component that receives from a first device a message of a first format; and
    a unified messaging component that analyzes the message and converts the message to a second format that corresponds to a target device that conveys the message in accordance with a user instruction, the user instruction being transmitted via the currently selected user interface.

18. The method of claim 17, wherein the received message is text based.

19. The method of claim 18, wherein the converted message is audibly based, wherein at least one of the following: a rule-based logic component and an artificial intelligence component, is employed to analyze a content of the received message and identify an important portion of the message for delivery to a user.

20. The method of claim 19, wherein the content of the received message is date and time synchronized with the converted message's content.

* * * * *